United States Patent
Albrecht et al.

(10) Patent No.: US 12,168,269 B2
(45) Date of Patent: Dec. 17, 2024

(54) SYSTEMS AND METHODS TO SELECT WELD PARAMETERS BASED ON THERMAL, ELECTRICAL, AND/OR CHEMICAL PROPERTIES

(71) Applicant: Illinois Tool Works Inc., Glenview, IL (US)

(72) Inventors: Bruce Albrecht, Neenah, WI (US); Todd Holverson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 469 days.

(21) Appl. No.: 17/576,317

(22) Filed: Jan. 14, 2022

(65) Prior Publication Data

US 2022/0226922 A1    Jul. 21, 2022

Related U.S. Application Data

(60) Provisional application No. 63/137,937, filed on Jan. 15, 2021.

(51) Int. Cl.
*B23K 9/095*    (2006.01)
*B23K 31/12*    (2006.01)

(52) U.S. Cl.
CPC .......... *B23K 9/0953* (2013.01); *B23K 9/0956* (2013.01); *B23K 31/12* (2013.01)

(58) Field of Classification Search
CPC ..... B23K 9/0953; B23K 9/0956; B23K 31/12
USPC .......................................................... 700/212
See application file for complete search history.

(56) References Cited

U.S. PATENT DOCUMENTS

| | | | |
|---|---|---|---|
| 3,627,574 A | 12/1971 | Delong | |
| 4,628,176 A | 12/1986 | Kojima | |
| 4,717,805 A | 1/1988 | Miyagawa | |
| 4,973,814 A | 11/1990 | Kojima | |

(Continued)

FOREIGN PATENT DOCUMENTS

| | | | | |
|---|---|---|---|---|
| CA | 2535699 A1 | * | 9/2006 | ............... B23K 9/10 |
| CA | 2617882 C | * | 11/2013 | ............. B23K 13/02 |

(Continued)

OTHER PUBLICATIONS

Dongwon, Kim, "Workshop Practice", Cheong Moon Gak Publishing, Jan. 10, 1993, pp. 148-149 (4 pages).

(Continued)

*Primary Examiner* — Ronald D Hartman, Jr.
(74) *Attorney, Agent, or Firm* — McAndrews, Held & Malloy, Ltd.

(57) ABSTRACT

An example welding interface device, includes: a user interface device; a processor; and a machine readable storage device comprising machine readable instructions which, when executed by the processor, cause the processor to: determine, via the user interface device, information describing physical characteristics of a workpiece for a weld to be performed; based on the physical characteristics, determining at least one of a thermal characteristic of the workpiece, an electrical characteristic of the workpiece, or a chemical characteristic of the workpiece; determine a boundary condition associated with the workpiece based on the at least one of the thermal characteristic, the electrical characteristic, or the chemical characteristic; and output a welding process based on the boundary condition.

20 Claims, 12 Drawing Sheets

(56) References Cited

U.S. PATENT DOCUMENTS

| | | |
|---|---|---|
| 5,278,390 A | 1/1994 | Blankenship |
| 5,571,431 A | 11/1996 | Lantieri |
| 5,683,598 A | 11/1997 | Moro |
| 6,002,104 A | 12/1999 | Hsu |
| 6,011,241 A | 1/2000 | Rongo |
| 6,087,627 A | 7/2000 | Kramer |
| 6,096,994 A | 8/2000 | Handa et al. |
| 6,167,328 A | 12/2000 | Takaoka |
| 6,297,472 B1 | 10/2001 | Bong |
| 6,476,354 B1 | 11/2002 | Jank |
| 6,479,793 B1 | 11/2002 | Wittmann |
| 6,624,388 B1 | 9/2003 | Blankenship et al. |
| 6,847,956 B2 | 1/2005 | Manicke |
| 6,852,949 B2 | 2/2005 | Lanouette |
| 7,180,029 B2 | 2/2007 | Ott |
| 7,781,700 B2 | 8/2010 | Harris |
| 8,124,913 B2 | 2/2012 | Artelsmair |
| 8,224,881 B1 | 7/2012 | Spear et al. |
| 8,525,077 B2 | 9/2013 | Peters |
| 8,592,722 B2 | 11/2013 | Ulrich |
| 8,604,389 B2 | 12/2013 | Stanzel |
| 9,089,920 B2 | 7/2015 | Kazmaier |
| 9,174,295 B2 | 11/2015 | Swartz |
| 9,802,265 B2 * | 10/2017 | Sickels ................ B23K 9/12 |
| 10,661,372 B2 * | 5/2020 | Ulrich ................ B23K 9/0953 |
| 2003/0111451 A1 | 6/2003 | Blankenship |
| 2004/0122550 A1 | 6/2004 | Klimko |
| 2004/0232128 A1 | 11/2004 | Niedereder et al. |
| 2005/0173390 A1 | 8/2005 | Lanouette |
| 2005/0199605 A1 | 9/2005 | Furman |
| 2005/0279742 A1 | 12/2005 | Stava |
| 2006/0016792 A1 | 1/2006 | Uecker |
| 2006/0086706 A1 | 4/2006 | Ulrich |
| 2006/0165552 A1 | 7/2006 | Kapoor |
| 2006/0196862 A1 | 9/2006 | Sickels |
| 2006/0207980 A1 | 9/2006 | Jacovetty |
| 2006/0213892 A1 | 9/2006 | Ott |
| 2007/0000895 A1 | 1/2007 | Giese |
| 2007/0051711 A1 | 3/2007 | Kachline |
| 2007/0056942 A1 | 3/2007 | Daniel et al. |
| 2007/0080154 A1 | 4/2007 | Ott |
| 2007/0181553 A1 | 8/2007 | Stanzel |
| 2007/0262065 A1 | 11/2007 | Peters |
| 2007/0267394 A1 | 11/2007 | Beck |
| 2008/0149686 A1 | 6/2008 | Daniel et al. |
| 2009/0039064 A1 | 2/2009 | Enyedy |
| 2009/0184098 A1 * | 7/2009 | Daniel ................ B23K 9/1043 |
| | | 219/130.01 |
| 2010/0108654 A1 | 5/2010 | Ulrich |
| 2010/0326962 A1 | 12/2010 | Calla |
| 2011/0023610 A1 | 2/2011 | Ume |
| 2011/0049116 A1 | 3/2011 | Rappl |
| 2011/0290765 A1 | 12/2011 | Albrecht |
| 2012/0006800 A1 | 1/2012 | Ryan |
| 2012/0205359 A1 | 8/2012 | Daniel |
| 2012/0241429 A1 | 9/2012 | Knoener |
| 2012/0298640 A1 | 11/2012 | Conrardy |
| 2013/0168375 A1 | 7/2013 | Aberg |
| 2013/0341307 A1 | 12/2013 | Sickels |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0061176 A1 | 3/2014 | Stanzel |
| 2014/0144899 A1 * | 5/2014 | Ulrich ................ B23K 9/1062 |
| | | 219/130.1 |
| 2014/0263226 A1 | 9/2014 | Daniel et al. |
| 2014/0312022 A1 | 10/2014 | Dantinne |
| 2015/0041447 A1 | 2/2015 | Niedereder |
| 2016/0243640 A1 * | 8/2016 | Albrecht ............. B23K 9/0956 |
| 2017/0036288 A1 * | 2/2017 | Albrecht ............. B23K 31/125 |
| 2018/0178305 A1 * | 6/2018 | Cole .................... B23K 9/0286 |
| 2021/0101220 A1 * | 4/2021 | Dunahoo ............. B23K 9/0953 |
| 2021/0129253 A1 * | 5/2021 | Matthews ............ B23K 9/1006 |
| 2021/0252628 A1 * | 8/2021 | Bergström ........... B23K 11/253 |
| 2021/0283706 A1 * | 9/2021 | Sickels ................. B23K 9/173 |
| 2021/0299777 A1 * | 9/2021 | Dunahoo ............. B23K 9/0953 |
| 2023/0129188 A1 * | 4/2023 | Hsu ....................... H04L 67/10 |
| | | 706/12 |

FOREIGN PATENT DOCUMENTS

| | | | |
|---|---|---|---|
| CN | 1841321 | 10/2006 | |
| CN | 101412174 | 4/2009 | |
| CN | 101574757 | 11/2009 | |
| CN | 102239025 | 11/2011 | |
| CN | 102357695 | 2/2012 | |
| CN | 102933345 A | 2/2013 | |
| CN | 104951691 | 9/2015 | |
| DE | 19602876 A1 | 7/1997 | |
| DE | 212015000071 U1 * | 12/2016 | ............ B23K 26/14 |
| EP | 0852346 A1 | 7/1998 | |
| EP | 0903195 A1 | 3/1999 | |
| EP | 1702707 A1 | 9/2006 | |
| EP | 1757397 A1 | 2/2007 | |
| EP | 1775056 A1 | 4/2007 | |
| JP | 1158027 A | 3/1999 | |
| JP | 11170048 A | 6/1999 | |
| JP | 2004058086 | 2/2004 | |
| WO | 03022503 | 3/2003 | |
| WO | 2008151393 | 12/2008 | |
| WO | 2010051104 | 5/2010 | |
| WO | 2013138831 | 9/2013 | |
| WO | 2017120491 | 7/2017 | |

OTHER PUBLICATIONS

Invertig.Pro Digital Completo, https://www.youtube.com/watch?v=1a8xGkDg9UU May 24, 2012.

Rippey, 'Proceedings of NIST Workshop: Industry Needs in Welding Research and Standards Development,' National Institute of Standards and Technology, Gaithersburg, MD, Apr. 1996 (30 pages).

TIG Welding is Now Much Simpler invertig.pro digital, Rehm Welding Technology 2011 (16 pgs.).

Yang Tiejun, et al., "Industrial Patent Analysis Report", Intellectual Property Press, May 31, 2014, pp. 237-238.

\* cited by examiner

SYSTEMS AND METHODS TO SELECT
WELD PARAMETERS BASED ON
THERMAL, ELECTRICAL, AND/OR
CHEMICAL PROPERTIES

RELATED APPLICATIONS

The present application claims the benefit of U.S. Provisional Patent Application Ser. No. 63/137,937, filed Jan. 15, 2021, entitled "SYSTEMS AND METHODS TO SELECT WELD PARAMETERS BASED ON THERMAL, ELECTRICAL, AND/OR CHEMICAL PROPERTIES." The entirety of U.S. Provisional Patent Application Ser. No. 63/137,937 is expressly incorporated herein by reference.

FIELD OF THE DISCLOSURE

This disclosure relates generally to welding systems, and more particularly, to systems and methods to select parameters for a welding system based on thermal, electrical, and/or chemical properties.

BACKGROUND

A range of techniques have been developed for joining workpieces by welding operations. These include diverse processes and materials, with most modern processes involving arcs developed between a consumable or non-consumable electrode and the workpieces. Welding processes with non-consumable electrodes may include tungsten inert gas (TIG) welding processes, which employ a non-consumable tungsten electrode that is independent from the filler material. The processes are often grouped in such categories as constant current processes, constant voltage processes, AC/DC processes, pulsed processes, and so forth. However, further divisions between these are common, particularly in processes that consume an electrode to add filler metal to the weld. The process selected is highly linked to the filler material and its form, with certain processes utilizing a particular type of electrode. For example, certain types of metal inert gas (MIG) welding processes, which form part of a larger group sometimes referred to as gas metal arc welding (GMAW).

In GMAW welding, an electrode in the form of a wire is consumed by the progressing weld pool, melted by the heat of an arc between the electrode wire and the workpiece. The wire is continuously fed from a spool through welding torch where a charge is imparted to the wire to create the arc. The electrode configurations used in these processes are often referred to as either solid wire, flux cored or metal cored, seamed, or seamless. Each type is considered to have distinct advantages and disadvantages over the others, and careful adjustments to the welding process and weld settings may be required to optimize their performance. For example, solid wire, while less expensive than the other types, is typically used with inert shielding gases, active shielding gas or with a blend of two. Flux cored wires may not require separate shielding gas feeds, but are more expensive than solid wires. Metal cored wires do require shielding gas similar to solid wire and they typically has higher deposition and wider arc than that of solid wire. Shielded metal arc welding (SMAW) utilizes an electrode coated or filled with one or more compounds that produce shielding gas when the arc is struck. The properties and the cost of a weld application may be based on the welding process and weld settings utilized. Unfortunately, user selection of the welding process and the weld settings for a particular application may be complex.

SUMMARY

Systems and methods to select parameters for a welding system based on thermal, electrical, and/or chemical properties are disclosed, substantially as illustrated by and described in connection with at least one of the figures, as set forth more completely in the claims.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1:
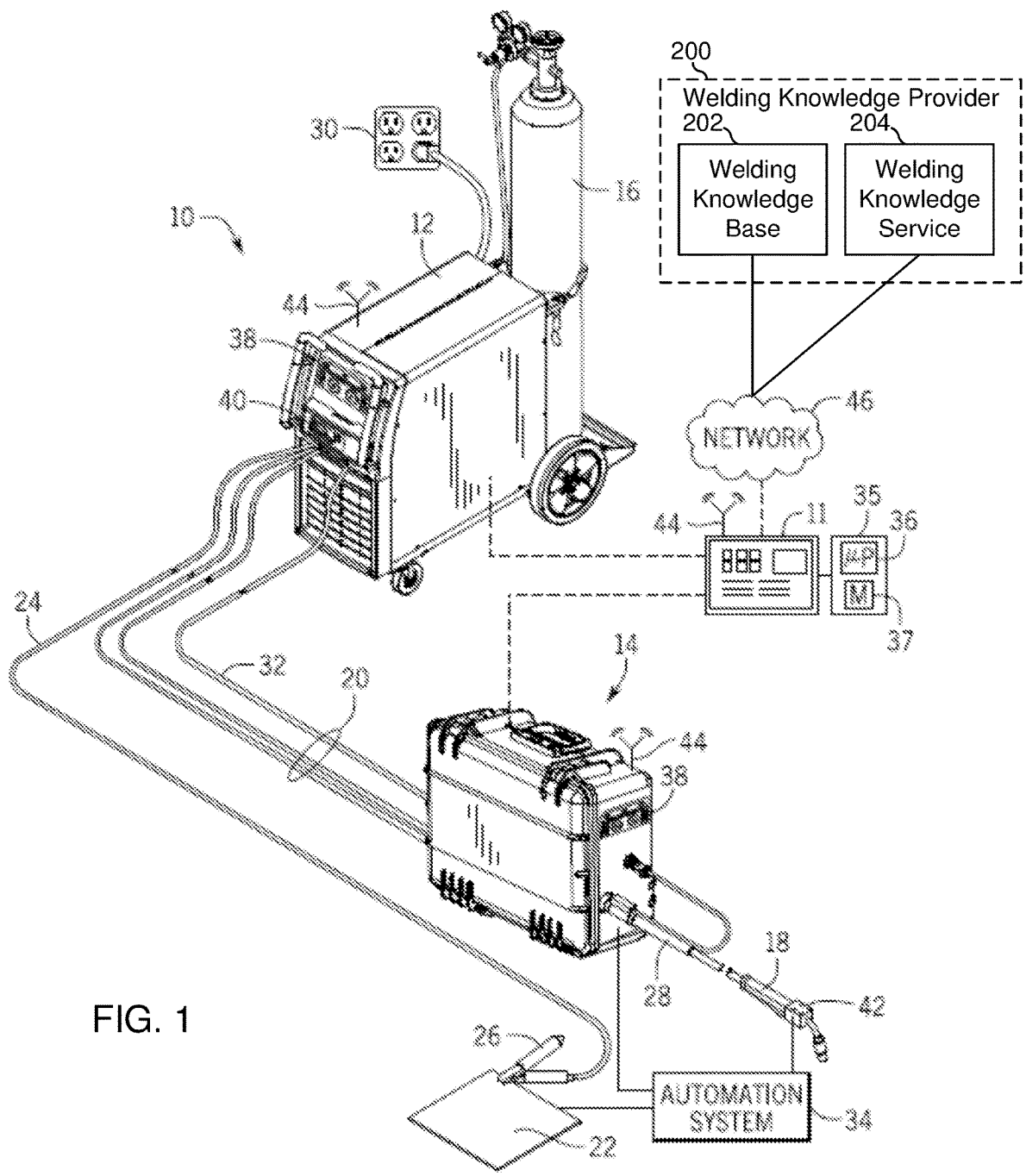
FIG. 1 illustrates an example welding system including a welder interface to select parameters for a welding system based on thermal, electrical, and/or chemical properties in accordance the present disclosure.

One or more specific examples of the present disclosure will be described below. In an effort to provide a concise description of these examples, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," "the," and "said" are intended to mean that there are one or more of the elements. The terms "comprising," "including," and "having" are intended to be inclusive and mean that there may be additional elements other than the listed elements.

Examples of the welding system as described herein may include a welder interface that receives input parameters (e.g., physical characteristics, weld parameters) and determines one or more welding processes and welding variables for implementing the one or more welding processes based at least in part on the received input parameters. The welder interface may be incorporated with or separate from a welding machine, an automation system, a power source, a wire feeder, a torch, a pendant, a networked device connected (e.g., wired or wirelessly) to the welding system, or any combination thereof. The welder interface may receive the weld parameters directly from a user, and/or the welder interface may determine the weld parameters from data (e.g., computer-aided design file) imported to the welder interface. The welder interface may determine the weld process and the weld parameters based on a variety of factors including, but not limited to, desired characteristics (e.g., quality, appearance, penetration, strength, corrosion resistivity, creep resistivity) of the welding application, user productivity, capital costs, operating costs, or consumable inventory, or any combination thereof.

Some welding equipment users, such as welders such as hobbyists who perform one-off (e.g., infrequent) welding tasks and/or weld engineers who operate in high volume or high quality or high-mix, low volume welding production environments where changes to procedures require a weld engineer to quickly develop an applicable procedure qualification record (PQR) and/or weld procedure specification (WPS). For example, in the one-off case, welding that does not require documentation or qualification, such as farmers, simple or complex repair jobs, auto repair shops, and/or small fabrication shops perform unique welds and typically only have one chance (or few chances) to correctly weld. In high volume production shops or factories, changes in production, (e.g., due to a material change, or new parts/products, or a new production line being put in) may require following AWS recommended practices despite the lack of a specific PQR and/or WPS for the changed procedure. In many cases, the cost of developing a PQR and/or WPS is high because the test of welded assembly or product for serviceability, the development may cost labor and materials, and/or the weld engineer may be new and inexperienced. These types weld engineer would benefit from a rapid and accurate method of identifying an acceptable PQR and/or WPS.

Disclosed examples enable a welder to access a welding knowledge provider from a user interface to quickly access recommended welding procedures based on information input by the user. As used herein, a welding knowledge provider refers to a source of welding-related information accessible via a defined communications interface. In some examples, a welding knowledge provider is implemented as a data store and/or as a service (e.g., in a cloud service arrangement) that hosts the welding knowledge provider that can correlate input information with welding plans (e.g., processes, parameters, materials, equipment, and/or any other information). The welding knowledge provider may provide web services via an API (e.g., a representational state transfer (REST) API) for secure data access from a web browser and/or from mobile devices. A user of the user interface accesses the user interface at the mobile device (or other edge device) to interact with the welding knowledge provider, enter known welding information, and receive welding plan recommendations from the cloud. The user may then automatically configure the recommended parameters at the welding equipment using the interface.

As used herein, the term "welding plan" is defined as a collection of information which can be implemented to accomplish a weld. Example welding plans include one or more of: joint design, joint preparation and/or other pre-weld operation instructions (e.g., pre-heating, surface cleaning); welding procedures; and/or post-weld operational instructions. As used herein, the term "welding procedure" is defined as the operations taken by equipment and/or by a weld operator to accomplish a weld. For example, a welding procedure may include one or more weld program(s) and/or weld parameters used to control the output of welding equipment (e.g., power supply, wire feeder, etc.), and/or operator-performed actions or variables such as torch angle, travel angle, and/or travel speed.

After receiving a welding plan, the user may weld with the parameters in the welding plan and measure the welding results (e.g., weld size, weld penetration, weld bead shape, weld quality, heat and distortion and/or other mechanical and/or chemical properties). The user may then interact with the welding knowledge provider again by inputting these welding results, and requesting a further recommendation. Based on actual weld results, the welding knowledge provider may do further analysis based on the pre-existing models, and provide a new set of welding parameters. The request-recommendation-feedback analysis could be an iterative process until the user is satisfied with the welding results. In some examples, the feedback is incorporated into the welding knowledge provider such as by teaching an artificial intelligence system to improve its accuracy for future use.

In addition to the welding process and recommendations, the welding knowledge provider may also include welding cost information to take into account of labor cost and material cost and overhead. To access economics analysis, the user may input the labor rate, cost of welding consumables, and the like, but the welding knowledge provider may have access to publicly available data such as prices of equipment, consumables, electricity, and/or other cost factors on the Internet as a starting point that a user may override.

The welding knowledge provider recommendation may be a singular solution or multiple solutions. For example, the welding knowledge provider may provide a higher cost, higher performance solution along with a lower cost, lower performance solution. The welding knowledge provider may point out incompatibility of choices and automatically fix the bad choices a novice user may select via the user interface. The welding knowledge provider may automatically check for welding code compliance such as AWS code and/or ASME code. The welding knowledge provider may predict the likelihood of welding defects and discontinuities and provide steps for diagnostics.

The recommendations may include a shopping list of materials needed for the welding operation. The shopping list may include a distributor or store contact name, an item number, and/or a list price for materials to complete the recommended weld. The recommendation may also include, for display via the user interface, weld training videos, weld training providers nearby training on a particular weld operation (e.g. TIG).

The recommendations may also include rental facilities nearby to rent welding equipment for the recommended weld. The recommendation may include the availability of the recommended equipment at a local store, or change to alternative equipment or process based on the availability in local stores, which affects the welding plan displayed at the user interface. Recommendations may provide online ordering via the user interface and shipping to the user's address provided to the system.

In addition to the foregoing advantages, some disclosed systems and methods use electrical, thermal, chemical, and/or physical parameters to determine more sophisticated welding algorithms and/or plans for a given welding task than would be provided in conventional welding recommendation systems. While conventional welding recommendation systems may take into account conventional relationships when providing suggestions, disclosed examples enable intelligent recommendations and/or control to take into consideration more granular information about the weld to be performed to provide better results than conventional systems for the type of welding to be achieved when economic and/or mechanical optimization is desired on current materials, as well as for future workpiece materials and/or welding wire alloys. For example, disclosed systems and methods may consider the workpiece material to be welded, workpiece thickness, penetration, resistivity of the filler material, thermal conductivity of the workpiece and/or filler material, and other considerations based on the types of material involved in the welding process to determine and recommend welding processes and/or parameters. Disclosed systems and methods determine and use thermal, electrical, and/or chemical properties of the gas, materials and metallurgical system that are interacting in the welding or joining process, that enable the welding or joining, and/or that are consumed before, during, and after the welding or joining. Example materials and metallurgical systems include, but are not limited to, the type of material joined, filler material and coatings, contact tip and/or other welding and/or joining equipment, and/or various alloys used to achieve the weld and create an optimized system.

For example, typical ferritic and austenitic stainless steels have low thermal and electrical conductivity. Compared with welding on steel, higher voltages are more likely to cause a burn through because the welding heat does not transfer throughout the part and plate as rapidly. Additionally, the molten weld bead is more likely to stay hot longer on a stainless steel workpiece than on a steel workpiece. In contrast with conventional systems, disclosed systems and methods may take into account these thermal and electrical conductivity characteristics to make a welding process recommendations for performing a weld on, for example, thin stainless steel with poor fit up, by establishing boundary conditions to keep voltage and/or arc power lower for a given wire feed speed (when compared to steel welding).

As used herein, the term "boundary condition" refers to a welding-related condition that is used as a limit for determining or controlling the welding process to be performed on a workpiece. Example boundary conditions can be upper or lower limits, and may include limits on heat input, power, voltage, current, wire feed speed, penetration, peak current, di/dt, and/or any other welding parameter, process, variable, and/or other condition.

As used herein, the term "thermal characteristic" refers to a characteristic relating to internal and/or external transfers of heat energy by a material, and/or reaction of the material to heat energy or temperature. Thermal characteristics may include and/or overlap with physical, electrical, and/or chemical characteristics.

As used herein, the term "electrical characteristic" refers to a characteristic relating to conduction of electricity through and within the material, and/or reaction of the material to electrical conduction. Electrical characteristics may include and/or overlap with physical, thermal, and/or chemical characteristics.

As used herein, the term "chemical characteristic" refers to a characteristic relating to the chemical and/or atomic properties of the material. Chemical characteristics may include and/or overlap with physical, thermal, and/or electrical characteristics.

Example welding interface devices disclosed herein include: a user interface device; a processor; and a machine readable storage device storing machine readable instructions. The instructions, when executed by the processor, cause the processor to: determine, via the user interface device, information describing physical characteristics of a workpiece for a weld to be performed; based on the physical characteristics, determining at least one of a thermal characteristic of the workpiece, an electrical characteristic of the workpiece, or a chemical characteristic of the workpiece; determine a boundary condition associated with the workpiece based on the at least one of the thermal characteristic, the electrical characteristic, or the chemical characteristic; and output a welding process based on the boundary condition.

In some example welding interface devices, the instructions are configured to cause the processor to determine the thermal characteristic of the workpiece by determining at least one of thermal conductivity, shrinkage rate, cooling rate, melting temperature, solidification temperature, solidification time, vaporization temperature, vaporization time, or a thermal expansion coefficient. In some example welding interface devices, the instructions are configured to cause the processor to determine the chemical characteristic of the workpiece by determining at least one of a grain structure, base metal effects from autogenous welding, dilution, heat affect zone, discoloration, smut, solidification crack sensitivity, hot crack sensitivity, hydrogen solubility, porosity, alloy chemistry, quantity of impurities on the workpiece, or a type of impurities on the workpiece based on the physical characteristics.

In some example welding interface devices, the instructions are configured to cause the processor to determine the electrical characteristic of the workpiece by determining at least one of electrical resistivity, emissivity, oxidation resistivity, or magnetic susceptibility. In some example welding interface devices, the physical characteristics comprise at least one of a workpiece material, work piece condition, weld size, joint preparation, weld joint, room for expansion and contraction within the welding fixture and weldment, a workpiece thicknesses, a workpiece cleanliness, a joint type, a weld position, or a gap width.

In some example welding interface devices, the instructions are configured to cause the processor to: determine, via the user interface device, information describing physical characteristics of a filler material for the weld to be performed; and based on the physical characteristics, determining at least one of a thermal characteristic of the filler material, an electrical characteristic of the filler material, or a chemical characteristic of the filler material. In some examples, the physical characteristics of the filler material comprise at least one of a wire composition, a wire base metal, a wire filler material, or a wire diameter. In some examples, the instructions are configured to cause the processor to determine the electrical characteristic of the filler material by determining at least one of electrical resistivity of the filler wire, electrical resistivity of a cored wire sheath, electrical resistivity of a wire core material, cross-section proportion of the wire sheath, cross-section proportion of the wire core material, emissivity, oxidation resistivity, or magnetic susceptibility. In some example welding interface devices, the instructions are configured to cause the processor to determine the thermal characteristic of the filler material by determining at least one of a solidification temperature, a melting temperature, a vaporization temperature, thermal conductivity, a shrinkage rate, a cooling rate, or a thermal expansion coefficient. In some example welding interface devices, the instructions are configured to cause the processor to determine the chemical characteristic of the filler material by determining at least one of grain structure, nano-particle content, ductility, columnar strength, a quantity of impurities in the filler wire, a type of impurities in the filler wire, hydrogen solubility, alloy chemistry, and base chemistry.

In some example welding interface devices, the instructions are configured to cause the processor to determine the welding process and weld material transfer mode by including at least one of a Controlled Short Circuit, an alternating current (AC) wire-fed process, or a pulse process as at least part of the determined welding process. In some example welding interface devices, the instructions are configured to cause the processor to determine the boundary condition by determining a first limit on the welding process based on the at least one of the thermal characteristic, the electrical characteristic, or the chemical characteristic, wherein the first limit is determined to reduce a likelihood of a welding anomaly in the weld.

In some examples, the instructions are configured to cause the processor to determine the boundary condition by determining the first limit based on at least one of a thermal characteristic of a filler material for the weld to be performed, an electrical characteristic of the filler material, or a chemical characteristic of the filler material. In some examples, the instructions are configured to cause the processor to determine the boundary condition by determining a second limit on the welding process. In some examples, the first limit is a lower limit on a parameter of the welding process and the second limit is an upper limit on the same parameter of the welding process.

In some example welding interface devices, the instructions are configured to cause the processor to, during creation of the weld: control a welding system based on the welding process to create the weld; access feedback information from the welding system, the feedback information comprising a plurality of variables detected by one or more sensors of the welding system; determine, based on the feedback information, at least one of a second thermal characteristic of the workpiece, a second electrical characteristic of the workpiece, a second chemical characteristic of the workpiece, a thermal characteristic of a filler material used for the weld, an electrical characteristic of the filler material, or a chemical characteristic of the filler material; change the boundary condition based on the determined characteristic; and control the welding system to perform the welding process based on the changed boundary condition.

In some example welding interface devices, the instructions are configured to cause the processor to determine a second boundary condition based on the determined characteristic. In some example welding interface devices, the feedback information comprises at least one of a weld voltage, a weld current, a weld power, an enthalpy, a preheating voltage, a preheating current, a preheating power, a penetration depth, a puddle dimension, a workpiece temperature, a short circuit duration, a short circuit frequency, a short circuit clear current, a travel speed, light spectrum to determine wire/weld pool chemistry, torch angle, contact-tip-to-work distance (CTWD), or a chemical analysis of a fume emitted from the weld. In some example welding interface devices, the instructions are configured to cause the processor to configure a welding-type power supply to perform the weld according to the welding process.

In some example welding interface devices, the instructions are configured to cause the processor to determine at least one of the thermal characteristic of the workpiece, the electrical characteristic of the workpiece, the chemical characteristic of the workpiece, or the boundary condition by communicating the information describing the physical characteristics of the workpiece to an external computing system and receiving the at least one of the thermal characteristic of the workpiece, the electrical characteristic of the workpiece, the chemical characteristic of the workpiece, or the boundary condition from the external computing system.

Other disclosed welding interface devices include a user interface device, a processor, and a machine readable storage device. The machine readable storage device stores machine readable instructions which, when executed by the processor, cause the processor to: determine, via the user interface device, information describing physical characteristics of a filler wire to be used to perform a weld; based on the physical characteristics, determining at least one of a thermal characteristic of the filler wire, an electrical characteristic of the filler wire, or a chemical characteristic of the filler wire; determine a boundary condition associated with the filler wire based on the at least one of the thermal characteristic, the electrical characteristic, or the chemical characteristic; and output a welding process based on the boundary condition.

Other disclosed welding interface devices include a user interface device, a processor, and a machine readable storage device. The machine readable storage device stores machine readable instructions which, when executed by the processor, cause the processor to: determine, via the user interface device, information describing physical characteristics of a workpiece for a weld to be performed and information describing physical characteristics of a filler wire to be used to perform the weld; based on the physical characteristics of the workpiece, determining at least one of a thermal characteristic of the workpiece, an electrical characteristic of the workpiece, or a chemical characteristic of the workpiece; based on the physical characteristics of the filler wire, determining at least one of a thermal characteristic of the filler wire, an electrical characteristic of the filler wire, or a chemical characteristic of the filler wire; determine a boundary condition associated with the combination of the filler wire and the workpiece based on a combination of at least one of the thermal characteristics of the filler wire, the electrical characteristics of the filler wire, or the chemical characteristics of the filler wire and at least one of the thermal characteristics of the workpiece, the electrical characteristics of the workpiece, or the chemical characteristics of the workpiece; and output a welding process based on the boundary condition.

In some example welding interface devices, the instructions cause the processor to determine the boundary condition associated with the combination of the filler wire and the workpiece in a weld pool. In some example welding interface devices, the instructions cause the processor to determine the boundary condition associated with the combination of the filler wire and the workpiece in a weldment.

Turning to the figures, FIG. 1 is a diagram of an example welding system 10 and a welder interface 11. It should be appreciated that, while the welding system 10 described herein is specifically presented as a gas metal arc welding (GMAW) system 10, the welder interface 11 may also be used with other arc welding processes (e.g., FCAW, FCAW-G, GTAW (TIG), SAW, SMAW) or other welding processes (e.g., friction stir, laser, hybrid). In some examples, the weld interface 11 may be utilized to facilitate combining weld processes and energy sources into hybrid-type processes, where an arc welding process is combined with an energy source, such as a laser, induction heating device, plasma, and so forth. More specifically, as described in greater detail below, the equipment and accessories used in the welding system 10 may include the welder interface 11 described herein. The welding system 10 includes a welding power supply 12 (i.e., a welding power source), a welding wire feeder 14, a gas supply system 16, and a welding torch 18. The welding power supply 12 generally supplies power to the welding system 10 and other various accessories, and may be coupled to the welding wire feeder 14 via a weld cable 20 as well as coupled to a workpiece 22 using a lead cable 24 having a clamp 26. In the illustrated example, the welding wire feeder 14 is coupled to the welding torch 18 via a weld cable 28 in order to supply welding wire and power to the welding torch 18 during operation of the welding system 10. In some examples, the welding power supply 12 may couple and directly supply power to the welding torch 18.

In the example of FIG. 1, the welding power supply 12 includes power conversion circuitry that receives input power from an input (e.g., alternating current (AC)) power source 30 (e.g., the AC power grid, an engine/generator set, etc.), conditions the input power, and provides DC or AC welding-type output power via the weld cable 20. As such, the welding power supply 12 may power the welding wire feeder 14 that, in turn, powers the welding torch 18, in accordance with demands of the welding system 10. The lead cable 24 terminating in the clamp 26 couples the welding power supply 12 to the workpiece 22 to close the circuit between the welding power supply 12, the workpiece 22, and the welding torch 18. The welding power supply 12 may include circuit elements (e.g., transformers, rectifiers, switches, and so forth) capable of converting the AC input power to a direct current electrode positive (DCEP) output, direct current electrode negative (DCEN) output, variable polarity, or a variable balance (e.g., balanced or unbalanced) AC output, as dictated by the demands of the welding system 10 (e.g., based on the type of welding process performed by the welding system 10, and so forth).

The illustrated welding system 10 includes a gas supply system 16 that supplies a shielding gas or shielding gas mixtures to the welding torch 18. In the illustrated example, the gas supply system 16 is directly coupled to the welding torch 18 via a gas conduit 32 that is part of the weld cable 20 from the welding power supply 12. In some examples, the gas supply system 16 may instead be coupled to the welding wire feeder 14, and the welding wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., shield the arc; improve arc stability, voltage, type of transfer, and/or penetration; limit the formation of metal oxides; improve wetting of the metal surfaces; alter the chemistry of the weld deposit; etc.).

In addition, in some example systems, an automation system 34 may be used in the welding system 10. The automation system 34 may include controllers and actuators to automatically control at least a portion of the welding system 10 without additional user input. In some examples, the automation system 34 is connected to the power source 12, the wire feeder 14, the torch 18, and/or the workpiece 22. The automation system 34 may be a robotic welding system that may control the relative movement between the torch 18 and the workpiece 22 according to instructions loaded to the automation system 34. In some examples, the automation system 34 may control the power source 12 and/or the wire feeder 14 to control the weld process and the weld variables for a desired welding application. As discussed below, the automation system 34 may control the power source 12 and/or the wire feeder 14 based at least in part on the weld process and the weld variables determined by the welder interface 11 for the desired welding application.

The welder interface 11 includes a controller 35 to facilitate processing information related to the welding system 10. As discussed below, the user may provide input to the welder interface 11, and the welder interface 11 determines the weld process and/or the weld variables for a welding application based on the provided input. The example controller 35 includes a processor 36 to execute instructions loaded to the welder interface 11 and/or stored into a memory 37 to determine the weld process and/or the weld variables. In some examples, the welder interface 11 is incorporated with a wire feeder control panel 38, a power source control panel 40, a torch control panel 42, or any combination thereof, as illustrated by the dashed lines. Additionally, or in the alternative, the welder interface 11 may be a pendant along the weld cable 20, 28 or lead cable 24. In some examples, the welder interface 11 may be separate from the power source 12, the wire feeder 14, and the torch 18. For example, the welder interface 11 may include, but is not limited to, a computer, a laptop, a touchscreen, a heads-up display, a camera, a tablet, or a mobile device (e.g., a smartphone), and/or any other type of interface. The welder interface 11 may be connected to components of the welding system 10 through a wired connection or a wireless connection (e.g., via antennae 44). The connection with components of the welding system 10 may provide system information including, but not limited to, a type of power source, type of torch, or a type of wire feeder, or any combination thereof. The system information may be utilized to define processes available for the user and valid ranges for weld variables available for the user. In some examples, the welder interface 11 may connect with a network 46. The welder interface 11 may receive network input, such as managerial systems, welding system presets, and user preferences. In some examples, the input received by the welder interface 11 from the network 46 may include, but is not limited to, WPSs, PQRs, test files, preferred vendor lists, preferred weld systems, a sensed welding system, part numbers, direct costs data, indirect cost data, preferred process information (e.g., MIG vs. TIG), CAD files, look-up tables, neural network model, user profiles, training materials, operator manuals, and/or artificial intelligence inputs.

The welder interface 11 may transmit network output (e.g., operating history, user profiles, modified models) to the network 46. The network 46 may include, but is not limited to, a local network, a fleet network, an Internet-based resource (e.g., web page), a cloud-based resource, and/or any other type of communications network. As may be appreciated, the welder interface 11 may utilize information from the network 46, the welding system 10, and/or the user to establish presets and/or preferences for particular weld processes or weld variables. For example, a user may enter a preferred gas mixture and/or wire type to the welder interface 11, and the welder interface will advise the weld process and weld variables based at least in part on these preferences. Additionally or alternatively, the user may configure the welder interface 11 to restrict advised weld processes to one of an automated MIG process, an automated TIG process, or a manual MIG process. Moreover, a user may input a hybrid process, as discussed above, as a preferred process. Hybrid processes may enable the user to utilize the welding system to overcome limitations of a particular process through modeling the behavior of the particular process for the user for better understanding of the particular process and/or combining additional processes to overcome the limitations. For example, a friction stir process alone may be less suitable for a steel workpiece; however, the welder interface 11 may advise combining induction heating or a laser process with the friction stir process to allow the workpiece to plasticize, thereby increasing the suitability of the friction stir process. Additionally or alternatively, filler material may be added into the stir of the friction stir process to fill into the tool exit hole to eliminate the run-off tab.

The example welder interface 11 of FIG. 1 may additionally or alternatively be used to access a welding knowledge provider 200 via the network 46. The welding knowledge provider 200 includes a welding knowledge base 202 and/or a welding knowledge service 204. The welding knowledge base 202 includes an automated system (e.g., one or more computers, one or more servers, a cloud computing arrangement, etc.) capable of storing and/or retrieving welding plans and dispensing welding recommendations and/or knowledge.

The welding knowledge service 204 provides a connection to one or more service providers operated by humans who can receive information, perform research on welding information using input provided via the welder interface 11, seek further information from the operator via the welder interface 11, and/or respond with one or more recommended welding plans. Example implementations of the welding knowledge service 204 include a call center, live chat center, and/or any other customer service organization staffed by human operators who may be knowledgeable about welding (e.g., engineers, trained staff, etc.). Additionally or alternatively, the welding knowledge service 204 may connect a requester with independent contractors who have been determined to be qualified and/or knowledgeable about relevant welding procedures, such as engineers and/or certified welders.

The welding knowledge base 202 and/or the welding knowledge service 204 expose interfaces (e.g., application programming interfaces (APIs)) to enable the welder interface 11 to send requests to the welding knowledge base 202 and/or the welding knowledge service 204. The interfaces may include a standard format for requests to define relevant user-defined welding information.

Example user interfaces for sending welding information to the welding knowledge provider 200 and receiving one or more welding plans from the welding knowledge provider 200 are disclosed below with reference to FIGS. 5, 6, and 7.

Figure 2:
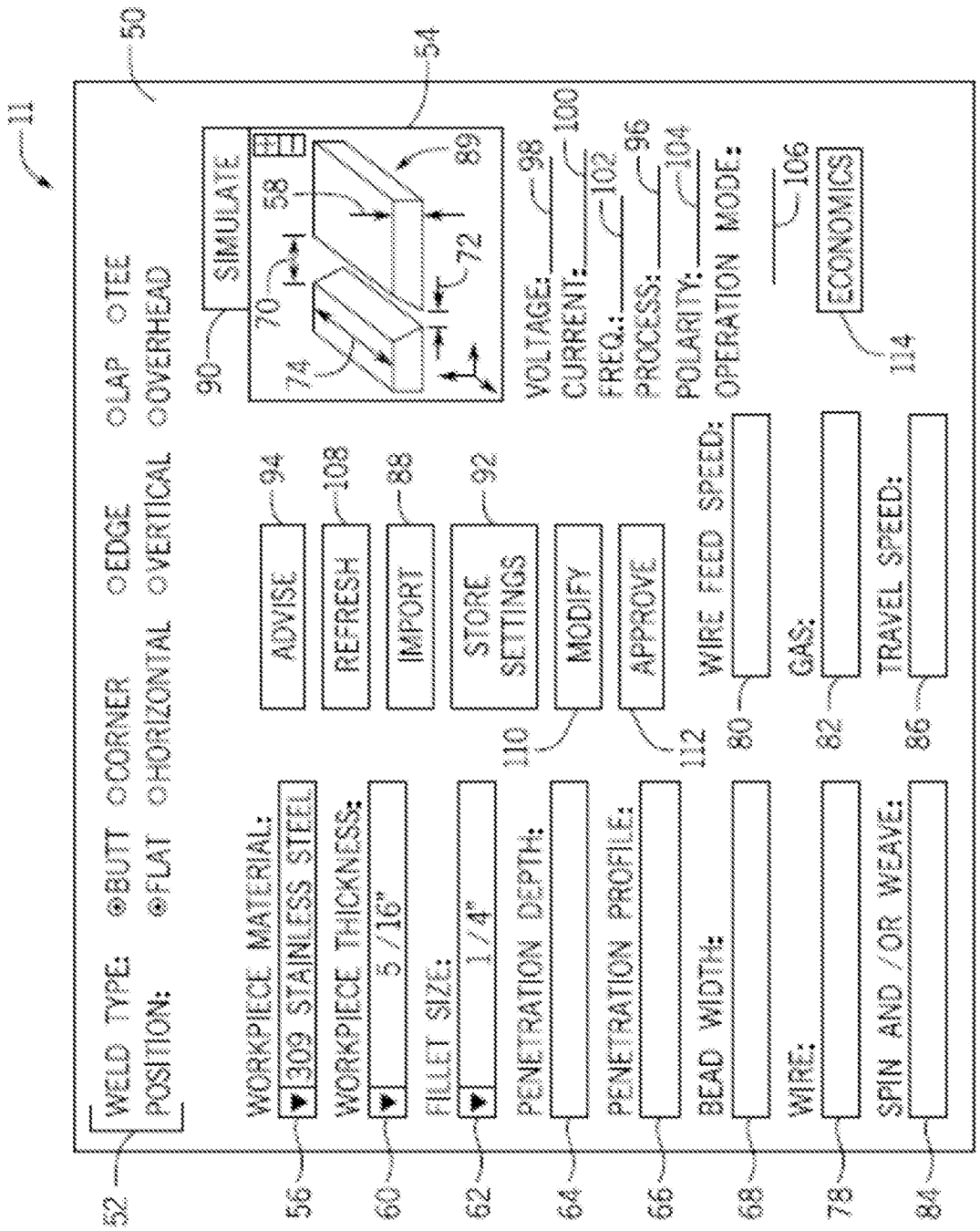
FIG. 2 illustrates an example welder interface that may be used to implement a user interface of the welding system of FIG. 1.

FIG. 2 illustrates an example of a graphical user interface (GUI) 50 of the welder interface 11. In some examples, the GUI 50 is displayed on a touch screen, thereby enabling the user to manually input information directly to the welder interface 11. Additionally, or in the alternative, the GUI 50 may be utilized with accessories coupled to the welder interface 11, such as buttons, dials, knobs, switches, etc. The GUI 50 enables the user to specify input parameters (e.g., physical characteristics) for a weld which the user will be making or reviewing. The input parameters may include, but are not limited to, weld joint configurations, weld position, welding materials, and weld bead parameters. As discussed below, the welder interface 11 may advise a weld process and corresponding weld variables based at least in part on physical characteristics for the weld with or without specifying electrical parameters (e.g., voltage, current, polarity, pulse duration), thereby simplifying the set-up and preparation of the welding system 10 prior to performing the weld. The welder interface 11 may advise a weld process with no welding variables specified as input characteristics, only some (e.g., 1, 2, 3, 4, 5, 6, 7, 8, 9, 10, or more) welding variables specified as input characteristics, or substantially all of the relevant weld variables specified as input characteristics. In some examples, the welder interface 11 may improve the quality and/or the repeatability of a weld regardless of the experience level of the user. Based on the input parameters, the controller 35 of the welder interface 11 determines the weld process and weld variables (e.g., electrical parameters) which may be used to set the power source 12, the wire feeder 14, and/or the torch 18 to perform the desired welding application. In some examples, the processor 36 executing the GUI 50 may automatically set the weld process and weld variables in the power source 12, the wire feeder 14, and/or the torch 18. Alternatively, the GUI 50 may display the determined weld process and weld variables to the user for approval or modification prior to setting the power source 12, the wire feeder 14, and/or the torch 18.

GUI 50 is shown having a weld type and position selection menu 52. For example, the user may specify a butt joint, a corner joint, an edge joint, a lap joint, a tee joint, or other weld joint type. Additionally or in the alternative, the user may specify a flat position, a horizontal position, a vertical position, or an overhead position. In some examples, weld type and position selection menu 52 of the GUI 50 has radio buttons to specify the type and position, though it is appreciated that other conventions such as check boxes, drop-down boxes, or tabs may be used equivalently. When a user selects a weld type and/or position option, such as a butt joint and flat position, a weld depiction window 54 of the GUI 50 may display a generalized or simulated view of the type and position of joint which has been selected.

The user may specify the type of workpiece material(s) via a drop down menu 56. Thus, the GUI 50 may be programmed to present a list of material types, such as various alloys, grades, and types of metals. In certain examples, the GUI 50 may be pre-programmed to present only common or user-preferred material types. The GUI 50 may be further programmed to automatically set default selections for each weld type or position. As an example, FIG. 2 illustrates the selection of a 309 Stainless Steel workpiece material. Similarly, the GUI 50 permits the user to select a thickness of the workpiece(s). For example, the GUI 50 may display in a drop down menu 58, a number of preferred or common material thickness options for the material type selected in the drop down menu 56. When the operator selects a workpiece material and thickness, the weld depiction window 54 of the joint can be automatically updated to reflect the chosen characteristics.

The GUI 50 may include boxes to enable the user to describe other characteristics of the joint and/or the weld itself. For example, the user may enter values for input parameters including, but not limited to, a desired fillet size 62, a desired penetration depth 64, a penetration profile 66, a bead width 68, a bevel width 70, a gap width 72, a joint length 74, a bevel angle, and/or any other parameters. In some examples, the user may manually enter the desired characteristics, rather than selecting them from menus. It may be appreciated, however, that other GUI conventions, such as menus and checkboxes may be used for inputting characteristics, or a click-and-drag type scalable control could be included in the GUI for increasing/decreasing a parameter value, such as the bead width 68. The specified characteristics may be shown in the weld depiction window 54, and the weld depiction window 54 may be modified as the characteristic values are adjusted. As may be appreciated, the user may readily determine the physical characteristics from a brief observation of the joint or a joint specification in a manual, whereas the determination of the weld process type and the weld variables (e.g., electrical parameters) for a weld application may be a more complex process. That is, the user may understand the physical characteristics of joint for the weld application regardless of the welding experience level of the user, whereas the understanding of the desired process and the weld variables for the desired weld application may increase with user experience. In examples for which the welder interface 11 may specify a GMAW welding process, the GUI 50 may also present inputs for wire type 78, wire feed speed 80, shielding gas type 82, spin or weave pattern 84, and/or travel speed 86. The user may leave one or more of the input parameters blank (e.g., no input parameter value), and the welder interface 11 may determine an advised value or range of values.

In some examples, the user may import preset joint characteristics and/or electrical parameters for a desired weld by selecting an import button 88. The import button 88 may enable the user to retrieve previously saved sets of joint characteristics from local memory storage (e.g., memory 37), or to input joint characteristics from an outside data source (e.g., network 46). For example, the joint characteristics may be uploaded directly from a CAD file or other architectural or engineering drawing and/or specification, a laptop computer, a mobile device, or a computer network. In other words, the welder interface 11 may download or receive data from a schematic specification file from a computing-type device and use such data to determine the joint characteristics and/or electrical parameters. The weld depiction window 54 may present a model 89 of the imported data (e.g., CAD file). In some examples, the GUI 50 may enable the user to modify the imported data. Additionally, or in the alternative, the user may control the weld depiction window 54 to change the model 89 of the imported data.

A simulate button 90 may enable the GUI 50 to display a simulation of the weld formation and/or the completed weld. The user may utilize the GUI 50 to manipulate the view and/or playback of the simulation. As may be appreciated, the simulation enables the user to preview an advised weld process, which may aid the user in performing the weld process. Additionally or alternatively, the user may modify the weld process and/or the weld variables upon observation of the simulation in order to change the result of the weld process from the simulated result. The user may utilize the simulations to review potential what-if tradeoffs between related weld variables. For example, the use of a particular welding wire with a particular workpiece material at particular welding parameters may be more susceptible to porosity, cracking, and/or other undesirable effects due to incompatibilities between the workpiece and wire materials. In some examples, a store settings button 92 may be used to create stored sets of characteristics (e.g., physical, electrical) from the current settings displayed by the GUI 50. These sets of characteristics may be stored in memory 37 and/or on the network 46, and may be retrieved for later use via the import button 88.

The GUI 50 includes command buttons to process the one or more user specified input parameters. The user may select an advise button 94 to control the welder interface 11 to determine one or more weld processes and weld variables to facilitate formation of the desired weld based at least in part on the specified input parameters. The GUI 50 will display the one or more weld processes, weld metal transfer modes, and/or weld variables (e.g., electrical parameters) by which to set the power source 12, the wire feeder 14, and/or the torch 18. These weld variables may include, but are not limited to, a weld process 96, a power source voltage setting 98, a power source current setting 100, a power source frequency 102, a polarity 104, and an operation mode 106 (e.g., constant current CC, constant voltage CV, or pulse). The weld process 96 may include, but is not limited to, GMAW, FCAW, FCAW-G, GTAW (TIG), SAW, SMAW, friction stir, laser, hybrid, tandem, plasma, additive manufacturing, and/or any other processes. Example weld metal transfer modes may include different types of pulsing, short circuit transfer, spray transfer, globular transfer, and/or combinations of weld metal transfer modes. In some examples, the weld variables determined by the welder interface 11 may include wire parameters (e.g., wire type 78, wire diameter, wire feed speed 80, quantity of wires), torch parameters (e.g., quantity of passes, weave width, spin and/or weave pattern 84, longitudinal torch travel speed 86, electrode spin speed, electrode extension speed, electrode retraction speed, travel angle, work angle), gas type 82, current changes over time (e.g., current ramp rates), voltage changes over time (e.g., voltage ramp rates), joules, pulse duration, induction heating temperature, and/or added laser energy. As discussed below, the welder interface 11 may utilize information from managerial preferences, user preferences, artificial intelligence, or other preferences, to determine the advised weld process and the weld variables. In some examples, the welder interface 11 may utilize information (e.g., reference data) from a welding procedure specification (WPS), a look-up table, a network database, a neural network, and/or any other artificial intelligence and/or machine learning system to determine the advised weld process and the weld variables.

As may be appreciated, upon selection of the advise button 94, the welder interface 11 may determine any of the input parameters left blank (e.g., no input value provided) and/or propose changes to input parameters to improve the resulting weld. For example, a blank or selected welding wire type, composition, or alloy may be replaced with a recommended welding wire type based on the electrical, chemical, thermal, and/or physical characteristics of the workpiece material and/or the welding wire. The GUI 50 may also enable the user to alter previously-selected input parameters (e.g., physical characteristics) and have the GUI 50 re-determine the weld process and the weld variables by selection of a refresh button 108. In some examples, the one or more weld processes and the weld variables determined by the welder interface 11 for the user may be displayed on one or more screens to be reviewed by the user. Upon review of the advised weld process and corresponding weld variables, the user may modify the advised determinations via selection of a modify button 110. For example, the user may modify one or more weld variables (e.g., wire feed speed 80, voltage 98, frequency 102) while maintaining at least some of the advised weld variables or input parameters. After modification (if any) of the weld variables or input parameters, the user may approve of the weld process and the weld variables via selection of an approve button 112, thereby enabling the welder interface 11 to control the power source 12, the wire feeder, and/or the torch 18 to perform the weld application with the advised weld process and the advised weld variables.

In some examples, an economics button 114 enables the user to review various economic factors for the advised weld process and weld variables. The cost of performing a welding application may be based at least in part on the cost of consumables (e.g., welding wire, contact tip, shielding gas, electrode), energy costs, labor costs, facility costs, equipment costs. For example, forming a weld for a deep groove application with relatively large wire diameter welding wire may have lower labor costs than forming the weld in the deep groove application with a relatively small wire diameter welding wire because of an increased number of passes to form the weld. Additionally, a flux cored or metal cored electrode may have a greater consumable cost than a solid electrode for some applications; however, the labor cost and/or shielding gas cost and/or labor skill dependency may be less for the flux cored or metal cored electrode than a solid electrode for other applications. Moreover, some weld processes (e.g., TIG processes, advanced weld processes, hybrid weld processes) may be associated with higher labor costs than other weld processes (e.g., SMAW processes, MIG processes), where higher labor costs may be based at least in part on greater operator skill level. Facility costs may include, but are not limited to, costs associated with maintenance and supply costs for the automation system 34 that may execute the weld process. Equipment costs may include, but are not limited to, costs associated with procurement of components of the welding system 10. User selection of the economics button 114 may display data that provides approximate costs for weld processes that may be utilized for the desired welding application. Accordingly, the welder interface 11 may advise a weld process and weld variables based at least in part on economic factors, such as cost.

Figure 3:
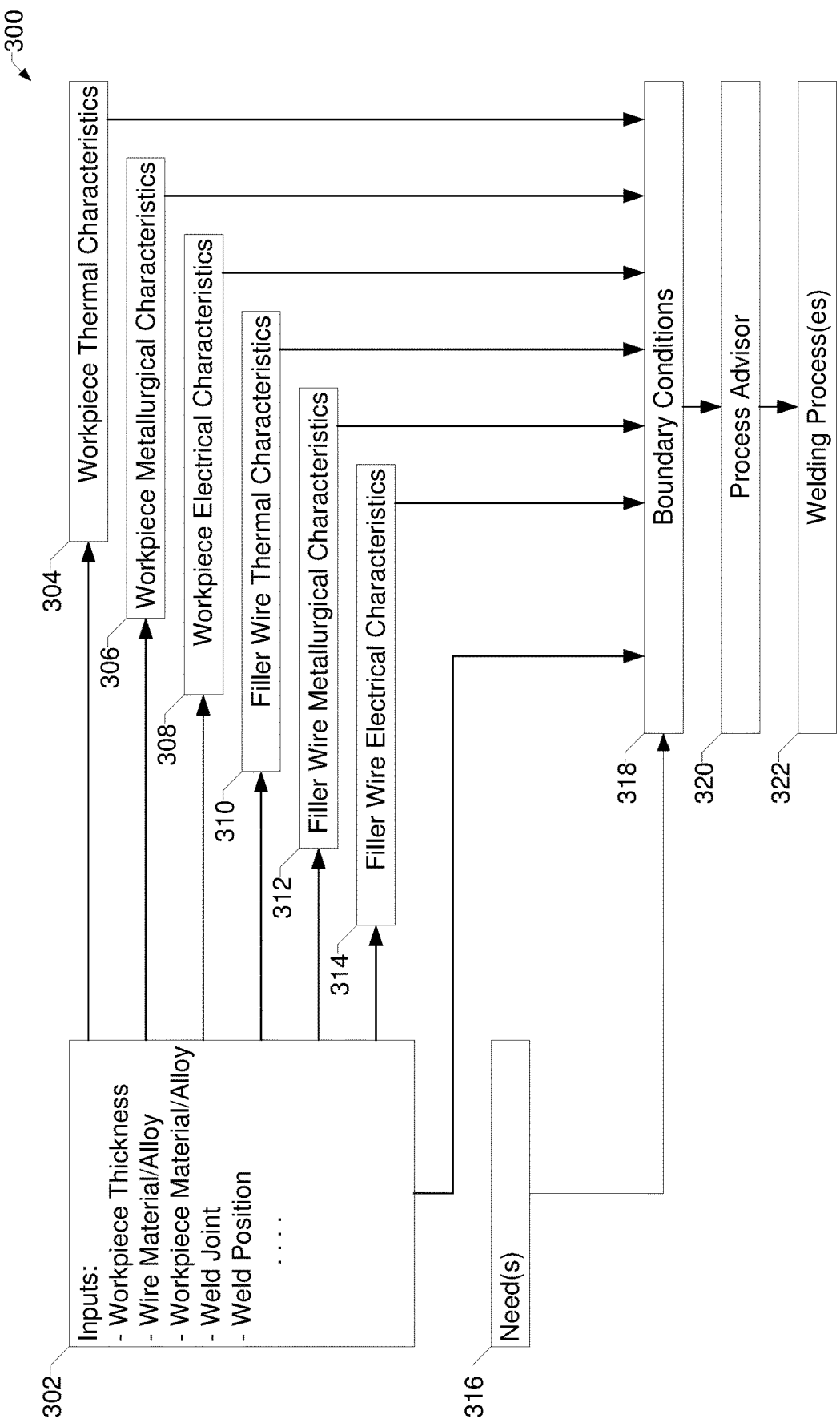
FIG. 3 is block diagram of an example system that may be implemented by the welding system of FIG. 1 to select parameters for a welding system based on thermal, electrical, and/or chemical properties.

FIG. 3 is block diagram of an example system 300 that may be implemented by the welding system 10 of FIG. 1 to select parameters for a welding system based on thermal, electrical, and/or chemical properties.

The example system 300 receives inputs 302, such as via the welder interface 11 of FIG. 2. Examples of such inputs 302 may include the physical characteristics such as the workpiece thickness 60, the workpiece material 56 (which may include alloying ingredients and/or other non-standard material information), a wire material or type 78 (which may include alloying ingredients and/or other non-standard material information), a weld joint type and/or position 52, gap width, preparation of the joint, position and/or orientation of the weld joint with respect to gravity (e.g., welding position), and/or any other physical characteristics of the workpiece, filler material, weld cable diameter and/or length, work cable diameter and/or length, and/or other aspects of the weld to be performed. The inputs 302 may be obtained from the operator via a GUI, by input of a WPS, via an automated system (e.g., a robotic welding system), via an automated data input (e.g., scanning a bar code for a part, workpiece, equipment, filler material spool, etc.), and/or any other method.

Using the inputs 302, the example system 300 determines one or more of thermal characteristic(s) of the workpiece 304, electrical characteristic(s) of the workpiece 306, chemical characteristic(s) of the workpiece 308, thermal characteristic(s) of the filler wire 310, electrical characteristic(s) of the filler wire 312, and/or chemical characteristic(s) of the filler wire 314.

Example thermal characteristics of the workpiece 304 that may be determined from the physical characteristics of the workpiece (e.g., the inputs 302) include thermal conductivity, shrinkage rate, cooling rate, melting temperature, solidification temperature, solidification time, vaporization temperature, vaporization time, and a thermal expansion coefficient.

Example chemical characteristics of the workpiece 306 that may be determined from the physical characteristics of the workpiece (e.g., the inputs 302) include a grain structure, base chemistry, base metal effects from autogenous welding, dilution, heat affected zone temperature, discoloration, welding smut, solidification crack sensitivity, hot crack sensitivity, hydrogen solubility, porosity, alloy chemistry, a quantity of impurities on the workpiece, and a type of impurities on the workpiece.

Example electrical characteristics of the workpiece 308 that may be determined from the physical characteristics of the workpiece (e.g., the inputs 302) include electrical resistivity, emissivity, oxidation resistivity, and magnetic susceptibility.

Example thermal characteristics of the filler wire 310 that may be determined from the physical characteristics of the filler wire (e.g., the inputs 302) include solidification temperature, melting temperature, vaporization temperature, thermal conductivity, shrinkage rate, cooling rate, and a thermal expansion coefficient.

Example chemical characteristics of the filler wire 312 that may be determined from the physical characteristics of the filler wire (e.g., the inputs 302) include grain structure, nano-particle content, ductility, columnar strength, a quantity of impurities in the filler wire, a type of impurities in the filler wire, hydrogen solubility, alloy chemistry, base chemistry, filler chemistry, flux chemistry, and/or any other chemical characteristics of a solid filler wire, sheath, flux, and/or filler.

Example electrical characteristics of the filler wire 314 that may be determined from the physical characteristics of the filler wire (e.g., the inputs 302) include electrical resistivity of the filler wire, electrical resistivity of a cored wire sheath and/or coatings, electrical resistivity of a wire core material, cross-section proportion of the sheath, cross-section proportion of the filler, emissivity, oxidation resistivity, and magnetic susceptibility.

In addition to the example thermal, electrical, and chemical characteristics disclosed above, additional thermal, electrical, and/or chemical characteristics may be determined or identified for combinations of workpieces, filler metals, and/or shielding gasses. These characteristics of the combinations may be identified through combinations of the individual thermal, electrical, and chemical characteristics of the workpiece, filler metal, and/or gas, and/or may be identified through the combinations of chemistry present in the workpiece, filler metal, and/or gas. For example, system 300 may determine boundary conditions based on the thermal, chemical, electrical, and/or physical properties 204-214 of combinations of the workpiece, filler metal, and/or shielding gas present in the weld pool and/or present in the resulting weldment.

In addition to the characteristics 304-314, the example system 300 may identify one or more needs 316 to be accomplished by the welding operation. For example, constraints may be placed on the resulting weld or welding operation by the operator, WPS, and/or other data source. Example constraints may include upper and/or lower limits on weld strength, a limit on hydrogen content in the weldment, limits on available materials and/or equipment, limits on weld operator qualifications, and/or any other constraints on the welding operation and/or the resulting weld.

Using the physical, thermal, chemical, and/or electrical characteristic(s) 302-314, the example system 300 determines a set of one or more boundary conditions 318 on the welding operation. A boundary condition may be set based on the identified characteristic(s) 302-314 to reduce a likelihood of a welding anomaly in the weld due to the associated characteristic(s). The boundary conditions 318 may be supplemented based on any need(s) 316 that are identified. The boundary conditions 318 may be determined by the system 300 based on individual physical, thermal, chemical, and/or electrical characteristic(s) 302-314, combinations of physical, thermal, chemical, and/or electrical characteristic(s) 302-314 for the workpiece, filler metal, or gas alone, and/or combinations of physical, thermal, chemical, and/or electrical characteristic(s) 302-314 for the workpiece, filler metal, and gas.

The example system 300 provides the boundary conditions 318 to a process advisor 320, which determines one or more welding processes 322 according to the boundary conditions 318. The welding processes 322 may specify welding metal transfer modes, welding parameters, and/or any other information needed to perform the appropriate welding process. In some examples, the process advisor 320 may recommend and/or adjust the physical characteristic(s) of the welding operation, such as by recommending characteristics of the fit-up of a joint, a groove angle and/or gap, the filler metal choice, and/or any other characteristics.

In an example of determining the physical, thermal, chemical, and/or electrical characteristic(s) 302-314, determining boundary conditions 318, and determining a welding process, an operator may specify in the inputs 302 that the workpiece and filler metal are both stainless steel alloys. Based on determining that the workpiece and welding wire are stainless steel, disclosed systems and methods may determine the applicable electrical, thermal, chemical, and/or physical characteristics of the workpiece and welding wire, and then identify a welding process, which may include welding parameters. For example, welding wire made of stainless steel does not typically respond well to high di/dt responses (large changes in current over time) in a short circuit condition, due to high resistance of stainless steel wire relative to more common mild steel solid welding wire. The weld current is squared when calculating power applied to the higher-resistivity stainless steel wire. Excess power in the welding wire can create instability and burn back the wire to the contact tip. Based on the electrical resistivity characteristic of the filler metal, the example system 300 establishes boundary conditions on the advised welding processes based on the electrical, thermal, chemical, and/or physical characteristics of the welding wire to, for example, recommend welding processes and/or parameters that keep the peak current lower in a short circuit condition than might be used with more typical steel welding wires. In addition, the system 300 may establish a boundary condition on the control strategy to manage power and heat based on the thermal conductivity and heat affected zone (HAZ) temperature characteristics of the stainless steel workpiece, to thereby reduce the HAZ to an acceptable limit. As a result, the example system 300 recommends a welding process, including welding parameters, that manage current to avoid excess power in the plate and/or in the welding wire.

In another example of determining a welding process based on electrical, thermal, chemical, and/or physical characteristics, an operator may specify that the workpiece is an aluminum alloy in the inputs 302. The system 300 determines, based on the specified alloy, electrical, thermal, and/or chemical characteristics 304-308. In general, aluminum has high thermal and electrical conductivities, even compared to mild steel, and aluminum melts at lower temperature than steel and stainless steel. As a result, an aluminum weld has a tendency to solidify rapidly at a much lower temperature due to melting point and thermal conductivity of aluminum. Due to the presence of impurities, such as oils and dirt, mechanical cleaning is preferable to avoid issues such as porosity. Conversely, there is a direct correlation between hydrogen porosity in aluminum and temperature. Atmospheric and moisture on the plate or wire can lead to hydrogen porosity as hydrogen is soluble in aluminum.

Based on at least the thermal and electrical characteristics of the specified aluminum workpiece, the example system 300 may set boundary conditions to provide the weld process with enough power for sufficient penetration, and to provide enough time for impurities in the workpiece and/or in the filler metal to emerge from the weld puddle. However, the system 300 may provide additional boundary conditions based on the chemical characteristics involving hydrogen porosity so that the welding process is not subject to hydrogen porosity.

Aluminum surface tension and its ability to cool the weld quickly does not allow for porosity to easily release into the atmosphere. Aluminum oxide is also highly resistive, melts at a higher temperature than aluminum, rapidly forms, and can absorb moisture making the weld quality more of a challenge.

By breaking down the inputs 302 into applicable electrical, thermal, chemical, and/or physical characteristics, the example system 300 provides a substantially improved ability to manage and adapt to a wide range of material types and thickness with various electrical, thermal, chemical, and physical parameters of the weld to be done.

The system 300 assesses the requirements for the welding operation based on the determined electrical, thermal, chemical, and physical parameters, and recommends an appropriate (e.g., optimal process, best available process, adequate process, etc.). In some examples, the system 300 uses multiple types of welding processes and/or weld metal transfer modes to control arc energy more precisely than would be possible for any one given welding process. By combining multiple processes, the system 300 can manage the needs 316 of a given weld and manage aspects of the weld procedure based on the electrical, thermal, chemical, and/or physical parameters.

In an example in which the operator specifies in the inputs 302 that the workpiece thickness is thin, the system 300 may be more likely to recommend a colder weld process and/or weld metal transfer mode such as Controlled Short Circuit. As the workpiece thickness is increased, the system 300 may recommend a combination of pulse welding and Controlled Short Circuit. As the workpiece thickness is increased, the system 300 may recommend increasing time is spent in the pulse process for transfer and decreasing time is spent in the Controlled Short Circuit. The Controlled Short Circuit process may be included in a combination of processes, based on the electrical, thermal, chemical, and physical parameters determined from the inputs 302 to, for example, keep the wire, ball and puddle cooler, avoid burn through with stainless steel workpieces, and/or avoid hydrogen porosity in aluminum workpieces and/or filler wire by not overheating the wire, ball and puddle. By combining welding processes, weld metal transfer modes, and/or welding parameters, the system 300 may gain additional advantages in managing the electrical, thermal, chemical, and/or physical characteristics of the weld to be performed.

In some examples, the system 300 may recommend electrode positive and/or electrode negative phases to a pulse process and/or a Controlled Short Circuit process. Welding arcs having electrode negative polarity tend to spread the arc plasma up the wire and over the workpiece at a lower energy density, thereby pre-heating the wire and workpiece. The heating of the wire via electrode negative polarity may clean impurities on the filler wire and precondition the workpiece. Electrode positive polarity, working together with the electrode negative cycle, may further provide cleaning effects on the workpiece. In contrast with conventional techniques involving manual management of cleaning and moisture by the operator, the example system 300 may implement or include periods of electrode negative and/or electrode positive polarity in the recommended welding process, weld metal transfer modes, and/or weld variables to provide a cleaning function in the welding process to clean the wire and workpiece to assist the operator in cleaning efforts. The weld parameters during the electrode negative polarity periods may be determined based on the electrical, thermal, chemical, and physical parameters 304-314. Additionally or alternatively, the system 300 may include periods of electrode negative polarity to reduce the heat on thinner workpieces, including or not including using Controlled Short Circuit periods, for extending a given welding process to thinner workpieces and/or additive manufacturing. In still other examples, the system 300 may include periods of electrode negative polarity to increase deposition rates of a welding process.

In some examples, the system 300 may use the electrical, thermal, chemical, and physical parameters 304-314 based on the input of an aluminum workpiece and/or filler wire to determine corresponding boundary conditions 318. Based on the boundary conditions 318, the system 300 may include Controlled Short Circuit welding processes and/or weld metal transfer modes to keep the puddle cool and to contact and disrupt the surface tension of the puddle to create a weld with less hydrogen porosity. For example, the physical agitation of the weld puddle that occurs during Controlled Short Circuits may encourage release of hydrogen pores and impurities from the weld puddle. Additionally or alternatively, the system 300 may further agitate the puddle by coordinating the agitation caused by the force of the plasma in GMAW-pulse welding, or by the mechanical force of a short circuit process such as Controlled Short Circuit or Regulated Metal Deposition (RMD™) processes.

Based on the electrical, thermal, chemical, and physical parameters 304-314, the example system 300 may recommend individual weld processes such as pulse, spray or short circuit, and/or recommend more advanced or sophisticated processes, and/or recommend combinations of processes. For example, combinations of processes may involve specifying a foundational process (e.g., pulse, spray, or short circuit), and include process enhancement techniques (e.g., electrode negative polarity, electrode positive polarity, AC waveforms, Controlled Short Circuit techniques, pulse waveforms, etc.) by interrupting the foundational process with different weld processes, techniques, waveforms, and/or weld circuit transfer modes for periods of time to meet the boundary conditions 318 determined based on the electrical, thermal, chemical, and physical parameters 304-314, which may be not be satisfied by the foundational process alone.

While the foregoing examples are disclosed with reference to wire-fed processes such as GMAW and FCAW, any other process may be used as a base process. In some examples, the system 300 uses GTAW as a base process, and more advanced processes can be determined with hot and/or cold wire technologies as process enhancers for the GTAW base process (e.g., based on the characteristics 304-314 and boundary conditions 318). Example process enhancers that may be recommended by the system 300 for a GTAW base process may include: using cold wire on thin material such as aluminum or stainless steel; improving productivity by performing wire preheating using the wire resistance and combinations of current, voltage, enthalpy, power, energy, joule heating, plasma chamber, and/or induction preheating; preheating the filler wire via plasma preheating to increase productivity and/or deposition, as well as cleaning the filler wire of moisture and/or contamination and managing the ball temperature to avoid hydrogen solubility and/or porosity; controlling the filler wire entry angle to fit the filler wire and/or the GTAW torch into tight spaces such as weld joint corners; and/or filler wire oscillation to agitate the puddle to further increase productivity and release porosity from the weldment in aluminum welding. However, any other processes and/or weld metal transfer modes may be used as process enhancers.

Example process enhancements based on electrical, thermal, chemical, and physical parameters 304-314 and/or resulting boundary conditions may include, but are not limited to, providing for physical engagement between the filler wire and puddle (e.g., for thinner workpieces) using Controlled Short Circuit to cool the wire, molten ball, and weld puddle, as well as to push or agitate the puddle to reduce porosity in aluminum; periodic wire puddle engagement (e.g., for medium to heavy plate welding) provide for some cooling in the weld transfer, molten ball, filler wire, and/or and puddle, as well as provide puddle agitation for porosity reduction in aluminum; gap filling and/or out of position welding using Controlled Short Circuit processes for thicker workpieces; and/or cleaning and/or preheating the workpiece and/or filler wire using AC MIG and/or electrode negative polarity. However, the electrical, thermal, chemical, and physical characteristics 304-314 and/or resulting boundary conditions 318, particularly from combinations of workpiece materials and filler wires, may provide for additional combinations of foundational processes and process enhancements. The example system 300 may be updated with newly developed processes, base materials, filler metal formulations, and/or other inputs 302, characteristics 304-314, and/or boundary conditions 318 to further improve the recommendations.

In some examples, the system 300 may determine boundary conditions 318 based on the electrical, thermal, chemical, and physical characteristics 310-314 of the filler wire, without the electrical, thermal, chemical, and physical characteristics 304-308 of the workpiece. Additionally or alternatively, the system 300 may determine boundary conditions 318 based on a combination of the electrical, thermal, chemical, and physical characteristics 304-314 represented in the expected weld pool, which can be caused by combinations of chemistry present in the workpiece, the filler metal, and/or the shielding gas. For example, in aluminum welding, the use of high-magnesium base material may result in a boundary condition that requires at least a lower limit of dilution of the magnesium into the weld pool and appropriate penetration, thereby resulting in the need of a lower magnesium filler metal and potentially lower limits on voltage, current, and/or penetration, upper limits on travel speed, and/or any other limits to effect the dilution of the magnesium in the weld chemistry. Example boundary conditions 318 include a maximum energy input to the welding operation and/or physical constraints due to thermal effects (e.g., expansion) on the resulting weld to avoid cracking.

Figure 4:
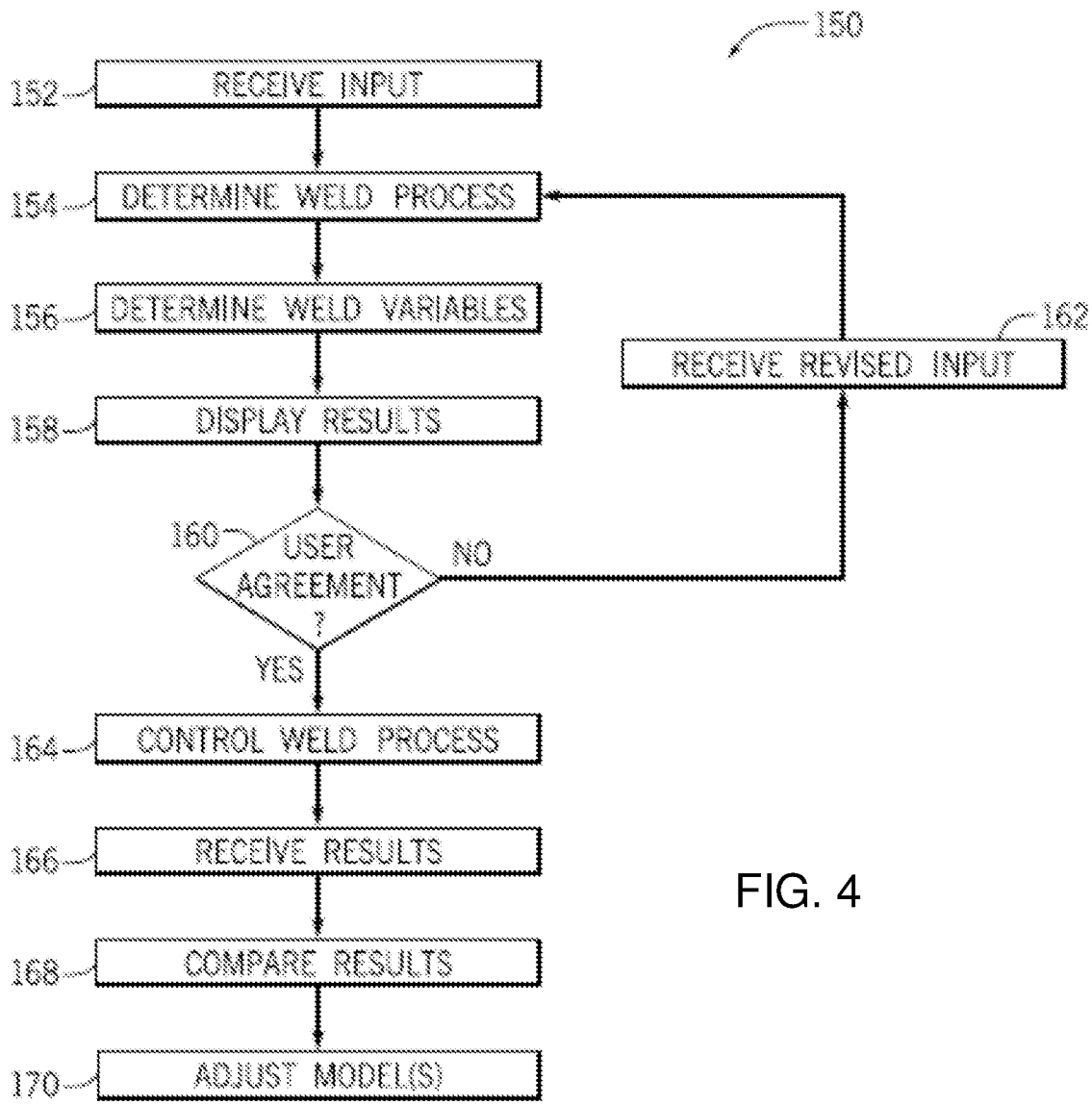
FIG. 4 is a flowchart representative of example machine readable instructions which may be executed to implement the welder interface of FIG. 1 to determine a weld process and weld variables.

FIG. 4 illustrates an example of a method 150 for utilizing the welder interface 11 for determination of a weld process and weld variables. The welder interface 11 receives (block 152) input parameters (e.g., physical characteristics) from the user. The input parameters may be received via manual input through the GUI 50 and/or automatically via importation of data (e.g., CAD file) as described above. Based at least in part on the received input parameters, the welder interface 11 determines (block 154) at least one weld process and determines (block 156) weld variables for the at least one weld process. The example blocks 154 and 156 may be performed by implementing the system 300 to recommend one or more welding processes, weld metal transfer modes, and/or weld parameters based on the electrical, thermal, chemical, and physical parameters 304-314 and/or resulting boundary conditions 318. Example machine readable instructions that may be executed to implement block 154 and/or block 156 are disclosed below with reference to FIG. 9. The welder interface 11 then displays (block 158) the results of the determined one or more weld processes and the weld variables to the user for review and approval. In some examples, the results may be displayed via a simulation of the weld process and/or the completed weld.

The welder interface 11 utilizes the received input parameters and determines the weld process (block 154) and the weld variables (block 156) utilizing data stored in the memory 37 and/or the network 46. The data stored in the memory 37 and/or the network 46 may relate various factors associated with weld processes and weld variables. For example, the determination of a particular weld process and the weld variables for the weld process may be based at least in part on the applicability (e.g., economics, quality, strength, appearance) of the weld process for various physical characteristics of the desired weld. The applicability of the determined weld process may include, but is not limited to, the economics (e.g., costs) of the determined weld process and weld variables, the user skill level, complexity of the determined weld process, welding systems available to the user, inventory available to the user, and user productivity/efficiency. The data stored in the memory 37 and/or the network 46 may be in the form of a look-up table, a neural network, a network database, managerial system, presets, a welding intelligence data, data analytics, and preferences to include a welding procedure specification (WPS), or any combination thereof. In some examples, the manufacturer and/or the user may populate data sets to be loaded into the memory 37 and/or the network 46 for a variety of weld processes. For example, TIG welding may be advised for a welding application with relatively thin workpiece materials and/or with aluminum alloys, and MIG welding may be advised for a welding application with relatively thick workpiece materials and/or for open root applications. In some examples, a friction stir and/or a hybrid process may be advised for a relatively flat bead profile and/or to decrease heating to the workpiece 22.

Upon display (block 158) of the advised weld process and the weld variables, the user decides (node 160) whether to accept the advised weld process and weld variables or to revise (block 162) the input provided to the welder interface to potentially generate a different advised weld process and weld variables. In some examples, the user may revise the input parameters (e.g., physical characteristics) provided to the welder interface 11. Additionally, or in the alternative, the user may add or remove input parameters (e.g., physical characteristics, electrical parameters) provided to the welder interface 11. As may be appreciated, the display (block 158) of the advised weld process and the weld variables may include the welder interface 11 simulating the advised weld process. The welder interface 11 may display the simulation at various speeds (e.g., real time, slow motion) and various views or orientations (e.g., 2D, 3D). Moreover, the welder interface 11 may display a simulation of the dynamics of the simulated weld from different perspectives, such as a close view illustrating the dynamics of the electrode and weld pool, or a component view (e.g., cross-sectional view) illustrating the effect on the joint and/or workpiece as a whole. The simulations displayed by the welder interface 11 may include, but are not limited to, simulated wire placement in the joint or weld pool, visual wire feed speed changes, graphs of predicted (e.g., simulated) current and voltage, puddle agitation, spatter levels, other effects, and/or any simulations.

When the user agrees to the advised weld process and the weld variables, the welder interface 11 may control (block 164) the components (e.g., power source 12, wire feeder 14, torch 18) of the welding system 10 to enable the user and/or the automation system 34 to perform the desired welding application. For example, the welder interface 11 may control the wire feeder 14 with the advised wire feed speed for an advised MIG welding process, and the welder interface 11 may set the voltage, current, and pulse parameters of the power source 12 for the advised MIG welding process. Upon completion of the weld, the user and/or the welder interface 11 may review the weld and generate results (e.g., scores) regarding observable qualities of the weld. For example, the user may review aspects of the appearance of the weld, such as bead width, bead spacing, penetration, burn through, porosity, cracks, and so forth. Additionally, or in the alternative, the user or the welder interface 11 may review aspects of the weld history, such as the voltage waveform, the current waveform, or filler metal (e.g., welding wire) utilized. The welder interface 11 may receive (block 166) results from the user to facilitate comparing (block 168) the results of the actual weld to prior results and/or to simulated results. Based at least in part on the comparison, the welder interface 11 may adjust (block 170) models in the memory 37 and/or on the network 46 that were utilized to advise the weld process and the weld variables.

In some examples, the method 150 described above may be utilized iteratively to populate data (e.g., models) for a look-up table, database, or neural network. For example, the user may initially only input the physical characteristics as input parameters, and the user may subsequently revise the input parameters to specify a particular weld process (e.g., TIG, MIG, SMAW) or a set of one or more electrical parameters (e.g., voltage, current, frequency, polarity, wire feed speed) to change properties of the resulting weld. The user may utilize the method 150 to determine the effect of adjusting one or more weld variables (e.g., electrical parameters), while maintaining or managing some level of change to the weld process and physical characteristics. This enables the user to modify the data to approximate variations that may occur during actual weld formation that may not be otherwise accounted for during a simulation of the weld. As another example, the user may modify the weld variables for the spin and/or weave patterns alone or in combination with the voltage, current, wire feed speed, and travel speed to control the deposition location of the electrode material to the weld. Additionally, or in the alternative, the weld current may be modified to control spray and/or spatter of electrode material, the weld voltage may be modified to control penetration, or travel speed may be modified to control the fluidity of the weld pool. Weaving and/or spinning may also provide advantages by way of puddle agitation, porosity, and/or cleaning. In some examples, iterative modification of the weld variables utilizing the welder interface 11 enables the user to generate robust models that may be utilized to advise a weld process and weld variables with relatively complex timing, speed, and energy levels to generate a desired weld even when the user provides relatively simple input parameters (e.g., physical characteristics).

The welder interface 11 may recommend the weld variables based on user preferences incorporated into the models. In some examples, the welder interface 11 may enable the welding system 10 to control the penetration depth to reduce or eliminate burn through of the workpiece 22. As may be appreciated, AC processes may be utilized to manage deposition and/or burn through. The welder interface 11 may advise a particular polarity to be utilized at certain points within the joint. For example, electrode positive (also known as reverse polarity) may increase penetration, and electrode negative (also known as straight polarity) when weaving the torch 18 over the sidewalls of the joint may reduce heat input into the workpiece materials than under a reverse polarity. Additionally, or in the alternative, the welder interface 11 may advise one or more pauses to alter the penetration in conjunction with the wire feed speed to adjust the penetration depth of the weld. In some examples, welder interface 11 may advise a combination of one or more weld processes (e.g., Controlled Short Circuit process in a first portion, an AC process in a second portion, and a pulse process in a third portion) to manage the penetration of a weld into the joint. The welder interface 11 may utilize feedback (e.g., sensor feedback from sensor(s) 48) from the welding system 10 to modify the weld process and/or the weld variables in substantially real-time. For example, the welder interface 11 may utilize position and/or motion feedback of the torch 18 and the electrode 120 (e.g., via sensors 48 configured to measure position, orientation, speed, and/or other data) relative to the workpiece 22 to control the timing of adjustments to weld variables.

Example sensors 48 that may be used to provide feedback information include voltage sensors (e.g., to measure arc voltage, power supply output voltage, and/or any other voltage in the weld circuit), current sensors (e.g., to measure welding current, motor current, etc.), position and/or orientation sensors (e.g., to measure positions, speeds, angles, and/or other spatial information about the torch 14, the weld operator, the workpiece, etc.), wire feed speed sensors, temperature sensors (e.g., to measure wire temperature, workpiece temperature, power supply temperature, ambient temperature, torch temperature, etc.), optical sensors (e.g., to recognize the arc, to measure the wavelength spectrum of the arc light, heat radiation, etc.), and/or any other type of sensors to measure weld variables and/or weld characteristics. In some examples, the sensors 48 may include virtual sensors, in which a circuit or software calculates or derives a variable or parameter value based on one or more other data elements (e.g., a virtual weld power sensor derived from measuring weld current and arc voltage).

In some examples, the models stored in memory 37 and/or the network 46 may be based at least in part on a volumetric calculation of deposited filler material, thermal dynamics of the welding application, and/or fluid dynamics of the molten filler material. For example, the welder interface 11 may advise a weld process with a deposition rate, travel speed, and wire feed speed that would deposit a volume of filler material (e.g., welding wire) that would fill the joint with a desired density/porosity. The welder interface 11 may be configured to advise the weld process based at least in part on forces acting on the filler material prior to solidification with the workpiece. For example, the welder interface 11 may advise the weld process based at least in part on the weld position, gravity, centrifugal forces on the molten filler material due to the conventional wire placement, weave of the torch and/or spin of the electrode, or any combination thereof.

The models utilized by the welder interface 11 may incorporate thresholds to maintain the advised weld process and the advised weld variables within desired economic bounds. For example, the welder interface 11 may be configured to advise a welding process with the lowest cost that satisfies the specifications for the desired weld. Additionally, or in the alternative, the welder interface 11 may be configured to advise welding processes that are within a range of skill levels to increase the reproducibility and the quality of the welds performed by users utilizing the welder interface 11. In some examples, when multiple weld processes may be capable of producing a desired weld based on the input parameters, the welder interface 11 may advise a weld process that has a lower cost and/or a lower complexity relative to other the capable weld processes.

The welder interface described above may increase synergy with the welding system for the user. The welder interface receives input parameters (e.g., physical characteristics) of a desired weld from a user and advises a weld process and weld variables (e.g., electrical parameters) for producing the desired weld. The welder interface may be integral with a component (e.g., power source, wire feeder, torch, robot) of the welding system, or a separate component that may be coupled (e.g., wired or wireless connection) with the welding system. The welder interface may utilize data from a look-up table, neural network, welding procedure system, database, or any combination thereof to advise the weld process and weld variables. As described above, the user may utilize the welder interface to simulate the weld process and the effect of the weld variables on a simulated weld. The user may modify the input parameters and/or the weld variables prior to producing a weld, and the user may modify the weld variables after reviewing the results of the produced weld to refine the advised weld process and weld variables for subsequent welding applications. In some examples, the welder interface may control the weld process and the weld variables in real time to control the results to a modeled result. For example, when welding a pipe root pass, the welder interface may receive feedback from a spin torch on the location of the wire placed in the joint via an encoder, tachometer, or other sensor. The feedback to the welder interface enables the welder interface to control the welding system to modulate the wire feed speed, the spin speed, the electrical parameters, or any combination thereof, to reduce or eliminate burn through. The welder interface may sense burn through or an impending burn through via sensing the voltage, current, visual appearance of the weld, or an audible sound of the weld, or any combination thereof. The welder interface may track the movement of the wire within the joint via observation of the voltage and spin as the wire rotates within the joint. In some examples, the welder interface may deliver the advised weld process and weld variables in real time to one or more welding systems at a work site, thereby enabling the one or more welding systems to be utilized for the advised weld process. Moreover, the welder interface may display the voltage, current, wire feed speed, and other weld variables on graphs, charts, or oscilloscope formats, or any combination thereof.

Figure 5:
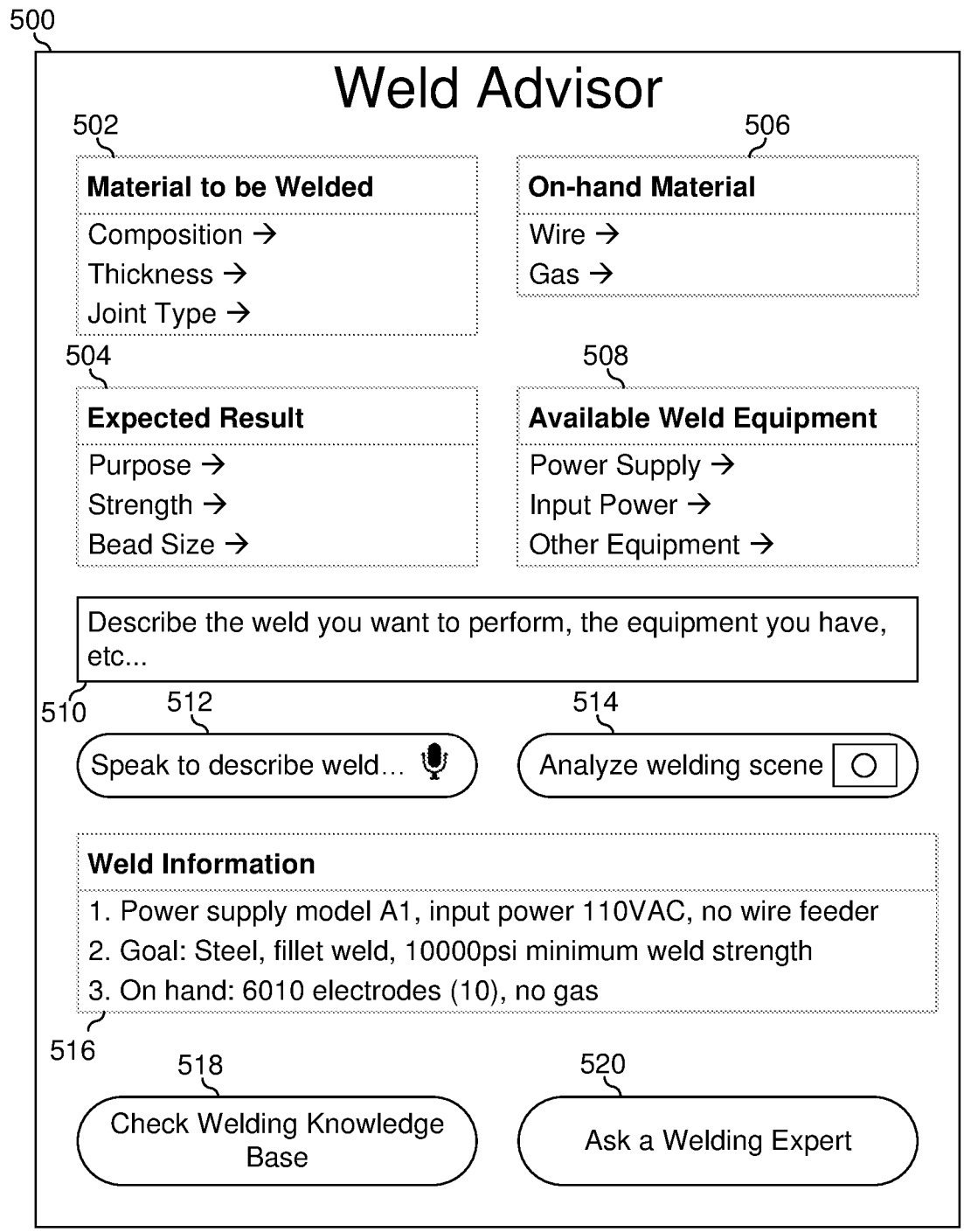
FIG. 5 illustrates an example user interface that may be presented on welding equipment, a computing device, a mobile device, or any other type of user interface device, to access information from the welding knowledge provider of FIG. 1.
Figure 6:
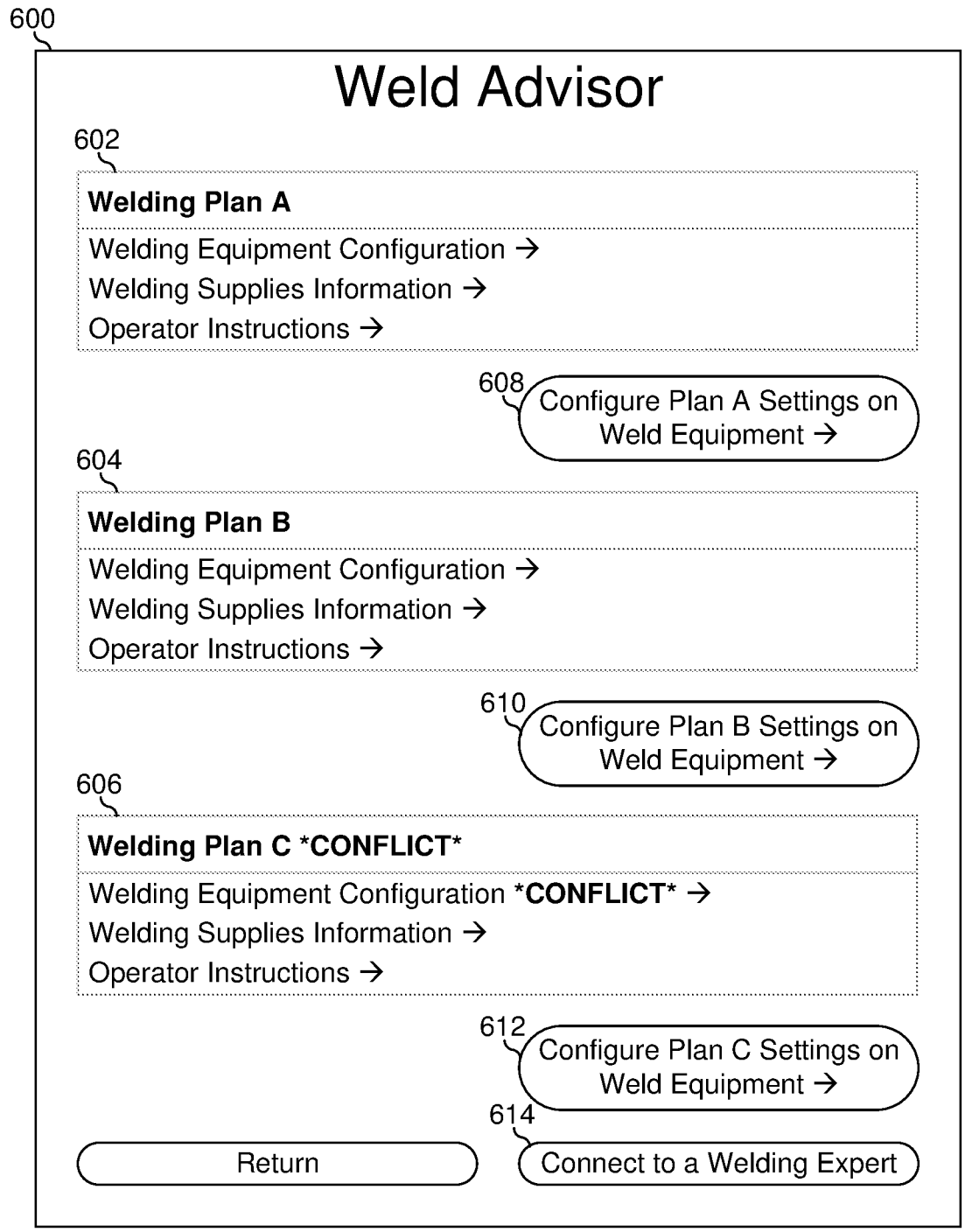
FIG. 6 illustrates an example user interface that may be presented on welding equipment, a computing device, a mobile device, or any other type of user interface device, to present one or more welding plans received from the welding knowledge provider of FIG. 1 in response to transmitting a request with welding information.
Figure 7:
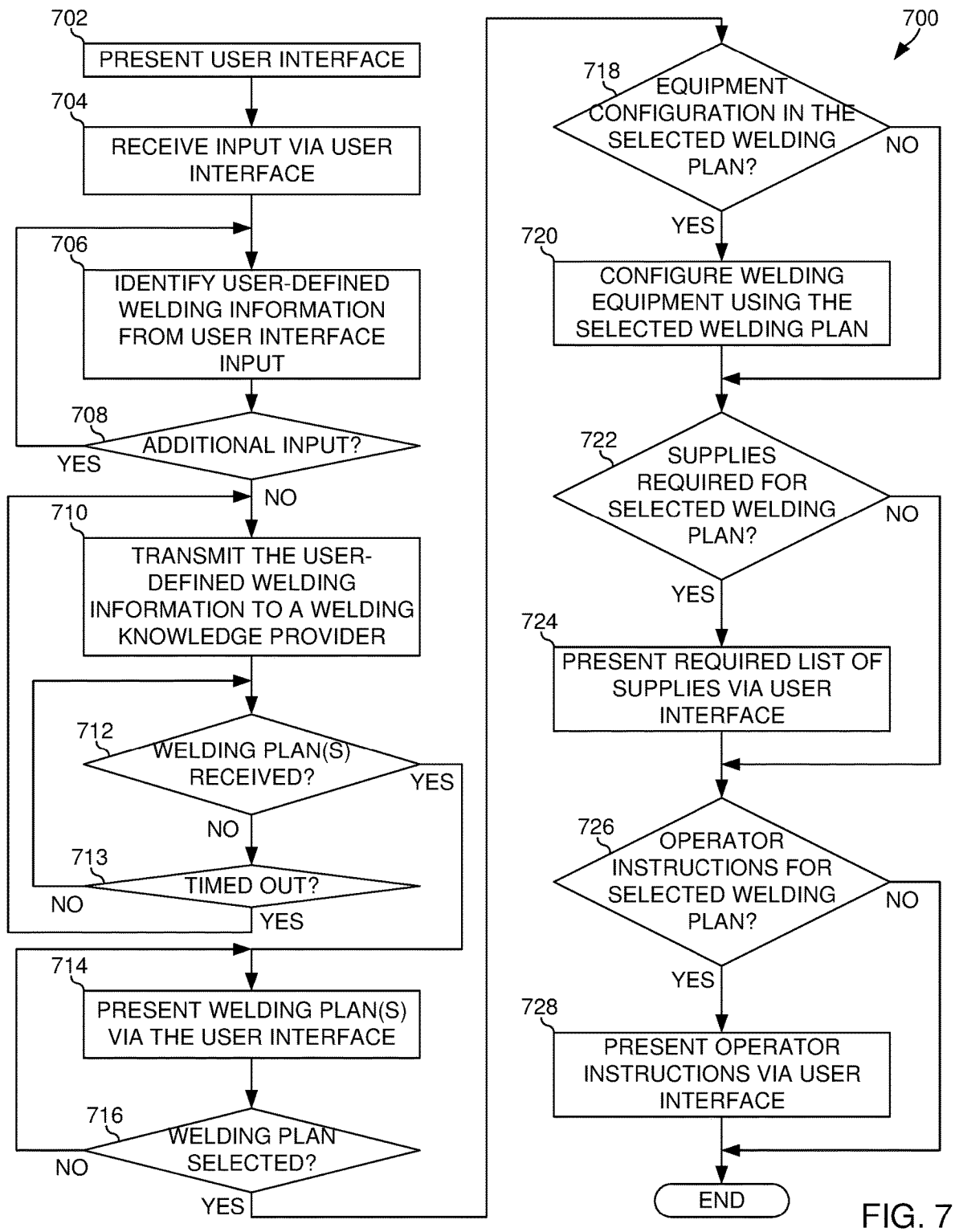
FIG. 7 is a flowchart representative of example machine readable instructions which may be executed by the example welder interface of FIG. 1 to select weld parameters.

FIGS. 5, 6, and 7 describe an example implementation of the welder interface 11 of FIG. 1 to receive user-defined welding information, provide the user-defined welding information to the welding knowledge provider 200, receive a welding plan from the welding knowledge provider 200, and implement the welding plan on welding equipment such as the welding power supply 12 and/or the wire feeder 14 of FIG. 1. The example welder interface 11 may be implemented in the welding power supply 12, in a separate computing device (e.g., a personal computer, a laptop computer, etc.) in communication with the welding power supply 12, and/or on an application executed on a mobile device such as a smartphone or tablet computer. While example implementing devices are described, the welder interface 11 may be implemented on any type of computing device.

FIG. 5 illustrates an example user interface 500 that may be presented on welding equipment, a computing device, a mobile device, or any other type of user interface device, to access information from the welding knowledge provider 200 of FIG. 1.

The example user interface 500 of FIG. 5 enables a user (e.g., a welder seeking advice for a weld) to enter user-defined weld information including material(s) to be welded 502, expected result(s) of the weld 504, on-hand material(s) 506, and/or weld equipment available to be used for the weld 508. However, other welding information may additionally or alternatively be provided. The user interface 500 includes menus to enable the user to describe the user-defined weld information using standard formats. The menus direct the user to sub-menus to logically define the material(s) to be welded 502, expected result(s) of the weld 504, on-hand material(s) 506, and/or weld equipment available to be used for the weld 508. The user-defined welding information may further include identification of available welding accessories and/or a location of the user and/or of the weld to be performed. As used herein, the term "on-hand" refers to being readily available to the user, such as welding wire and/or shielding gas that is available (e.g., previously acquired) for use by the user for welding.

In addition or as an alternative to the menu structure, the interface 500 includes as a free-form (e.g., natural language) text entry field 510 to enable the user to enter a description of the weld without being confined to a menu system. Information entered into the text entry field 510 may be interpreted by an application executing the user interface and/or communicated to a natural language processor for interpretation. The example text entry field 510 may be populated by a keypad on the user interface (e.g., a touch screen keyboard), by an external text entry device such as a keyboard, by selecting a speech recognition button 512 to activate a microphone for speech entry by the user, and/or using any other input device.

The example user interface 500 also includes a weld scene analysis button 514 to enable a user to scan a weld scene with a camera and perform image recognition to recognize one or more aspects of the weld scene. For example, the application providing the user interface may recognize joint, orientation, and/or thickness information, on-hand wire and/or gas information (e.g., by recognizing a barcode or other machine readable code identifying the wire and/or gas products), and/or weld equipment and consumables (e.g., by recognizing model numbers printed on the weld equipment and/or by recognizing sizes, shapes, configurations, and/or colors of the welding equipment and consumables. Example machine readable codes include bar codes, QR codes, RFID tags, and/or any other machine readable indicia.

The user interface 500 may identify weld equipment available to be used for the weld by identifying, based on the input received via the user interface 500, a welding power supply model, a welding power supply capability, a wire feeder model, a mains power supply, and/or an engine-driven power supply. The user interface 500 may identify material to be welded 502 by identifying, based on the input received via the user interface 500, a workpiece composition, a workpiece thickness, a workpiece orientation, and/or a fillet size. In some examples, a user interface such as the interface screen illustrated in FIG. 2 may be used to define or describe the material to be welded 502. The user interface 500 may identify an expected result of the weld 504 by identifying, based on the input received via the user interface 500, a purpose of the weld, an expected strength of the weld, a bead size, and/or a spatter level. The user interface 500 may identify on-hand material 506 by identifying, based on the input received via the user interface 500, an electrode composition, an electrode diameter, an electrode model number, a shielding gas composition, and/or a shielding gas model number.

Identified user-defined welding information is listed in a weld information dialog 516 to display to the user the user-defined welding information (e.g., for confirmation and/or correction by the user).

After entry of the user-defined welding information into the user interface 500, the user may select to check the welding knowledge base 202 of FIG. 1 for a recommended welding plan based on the user-defined welding information (e.g., Check the Welding Knowledge Base button 518) and/or to send the request with the user-defined welding information to the welding knowledge service 204 (e.g., Ask a Welding Expert button 520). Depending on which of the buttons 518, 520 is selected, the application presenting the user interface 500 formats and transmits the user-defined welding information to the welding knowledge base 202 and/or to welding knowledge service 204.

FIG. 6 illustrates an example user interface 600 that may be presented on welding equipment, a computing device, a mobile device, or any other type of user interface device, to present one or more welding plans received from the welding knowledge provider 200 of FIG. 1 in response to transmitting a request with welding information.

After the application presenting the user interface 500 of FIG. 5 sends the request and the user-defined welding information to the welding knowledge provider 200, the example welding knowledge provider 200 returns welding plans 602, 604, 606, which are displayed on the example user interface 600 (which may replace the user interface 500 on the device presenting the user interfaces 500, 600).

The welding plans 602, 604, 606 each specify one or more of a welding device configuration, welding supplies information, and/or welding operator instructions. The user may select one of the plans 602, 604, 606 to see the information associated with that welding plan. The user may select one of the plans via a corresponding selection button 608, 610, 612 (or any other selection mechanism, such as by selecting a welding plan 602, 604, 606 and selecting a "confirm" button. Upon selection of one of the selection buttons 608, 610, 612, the welder interface 11 configures the welding power supply 12 by downloading (e.g., by programming the output control circuitry if the welder interface 11 is incorporated into the welding power supply 12, or via a wired or wireless connection if separate from the welding power supply 12) relevant portions of the selected welding plans 602, 604, 606 (e.g., welding programs, welding machine parameters, etc.) to the welding power supply 12, the wire feeder 14, and/or any other equipment. For example, the welder interface 11 may automatically configure the welding power supply 12 by configuring the welding power supply 12 with at least one of a welding program or a welding parameter, where the welding program modifies a current command and/or a voltage command of the welding power supply 12 in response to feedback during welding. The welding plans 602, 604, 606 received from the welding knowledge provider 200 may include instructions necessary for the welder interface 11 to automatically program the equipment.

The welding plans 602, 604, 606 may display welding device configuration in the user interface 600 by presenting a voltage setpoint, a voltage range, a current setpoint, a current range, a wire speed setpoint, a wire speed range, a welding program, a welding power waveform, a hot start setting, and/or a wire feed speed for configuring the welding power supply. The welding plans 602, 604, 606 may display welding operator instructions in the user interface 600 by presenting welding cable and work cable connection information, welder safety information, a welding travel pattern, travel speed, contact tip to work distance, equipment set up instructions, workpiece fit up instructions, and/or welding operator body positioning instructions. Example operator instructions may also include displaying the joint in the app with an annotation of the virtual weld to illustrate to the operator how the workpiece fits and/or an annotation of a virtual torch to show the operator how to hold the torch in proper torch angle and travel angle. The virtual torch may be manipulated to simulate a weld sequence, which may include starting the weld by pulling trigger, weaving the arc, and/or stop by releasing the trigger. The welding plans 602, 604, 606 may display welding supplies information in the user interface 600 by presenting a welding power supply model number, a power supply rating plate, an image of welding equipment, an electrode composition, an electrode diameter, an electrode model number, a shielding gas composition, a shielding gas model number, a universal product code associated with a consumable item, an image of a consumable welding material, and/or purchasing information for the consumable welding material. Example purchasing information includes a shopping list of supplies and/or locations of supply stores, equipment dealers, and/or equipment rentals from which the user can obtain the necessary consumables and/or equipment.

Upon selection of one of the plans 602, 604, 606, the example user interface 600 may provide further relevant information, such as a local welding supply store from which the identified welding supplies that were not identified as on-hand in the user-defined welding information can be purchased.

In some examples, the welding knowledge provider 200 may communicate a conflict between one or more welding plans and one or more elements of the user-defined welding information. For example, the interface 600 an alert identifying incompatible user-defined weld information describing the weld (e.g., identifies a conflict between a welding equipment configuration component of the welding plan 606 and the user-defined welding information). For example, as illustrated in FIG. 6, the user interface 600 indicates a conflict, which may occur when the welding equipment needed for the welding plan 606 is different than the welding equipment specified in the user-defined welding information. The user interface 600 may further display, based on information included in the response from the welding knowledge provider 200, a suggested change to the user-defined weld information describing the weld. The user may choose to adopt the suggested changes and/or select a different welding plan.

In some examples, one or more of the boundary condition(s) 318 of FIG. 3 are associated with warning ranges or warning thresholds. The warning range may specify a set of values for one or more parameters associated with an applicable boundary condition, within which there is at least a threshold risk that the boundary condition may be violated. Similarly, warning thresholds may specify thresholds for one or more parameters, for which crossing the warning threshold creates at least a threshold risk that the applicable boundary condition may be violated. If a determined welding process and/or set of parameters is anticipated or simulated to enter the warning range and/or cross the warning threshold, the example interface 600 may provide a warning or conflict message indicating the risk of incompatibility or adverse results in the defined welding operation.

In some examples, the welding knowledge provider 200 identifies welding plans at least in part based on applicable welding codes and/or compares identified welding plans against the requirements of such codes. In the response to the welder interface 11 that includes the welding plans, the welding knowledge provider 200 may include the results of such welding code analyses. The user interface 600 may present an alert identifying a welding plan or configuration that is not compliant with an applicable welding code, based on the response received from the welding knowledge provider 200.

At the end of a welding operation performing using a selected welding plan 602, 604, 606, the welder interface 11 may present another interface including a prompt for an actual result of the welding operation. After receiving the result from the user, the welder interface 11 transmits the actual result of the welding operation to the welding knowledge provider 200. The welding knowledge provider 200 may analyze the result and, if necessary based on the result, select an updated welding plan and respond to the welder interface with the updated welding plan. The welder interface 11 then configures the welding power supply 12 using the updated welding plan received from the welding knowledge provider 200 in response to the actual result. The actual result of the welding operation may include measurement(s) of weld size, weld penetration, weld bead shape, weld quality, heat input, distortion, corrosion, a defect, a discontinuity, a weld strength, and/or a mechanical property.

In some examples, at the end of a welding operation performed using a selected welding plan 602, 604, 606, the welder interface 11 transmits measurement data generated by the welding power supply 12 to the welding knowledge provider 200. For example, the welder interface 11 may collect voltage and/or current information, wire feed speed information, duty cycle information, weld starts, weld stops, and/or any other data that can be collected by the welding power supply 12 and/or the feeder 14, and transmits the measurement data to the welding knowledge provider 200. The welding knowledge provider 200 analyzes the measurement information and identifies any potential anomalies, and/or whether the measurement data indicates an acceptable weld. The welding knowledge provider 200 may return a weld defect indication, a weld diagnostic procedure, and/or an indication of acceptability of the weld to the welder interface 11 for presentation via the welder interface 11. In some examples, the welding knowledge base 202 adds the measurement data and the corresponding welding plan to the welding knowledge base 202 for future reference and/or advisement in response to future requests.

The welding knowledge provider 200 may calculate economic data associated with each of the identified welding plans 602, 604, 606, and provide the economic data with the welding plans 602, 604, 606. The example user interface 600 may then present the welding plans 602, 604, 606 in order based on the economic data, such as presenting the welding plans 602, 604, 606 in order from least (or most) expensive to perform to most (or least) expensive to perform.

The example user interface 600 further includes a button 614 to connect the user to the welding knowledge service 204, such as via an audio and/or video link to enable the user to interact with a staff member or other service provider of the welding knowledge service 204. For example, the user interface 600 may include a video link with a remote service technician associated with the welding knowledge service 204 (e.g., located remotely). The user interface 600 and remote connection enables the service tech to send the user messages (e.g., request the user to point the camera at certain spot of the weld scene or the equipment) and/or annotate the feed from the user's camera to overlay information on the user interface (e.g., remotely draw annotation and text on the images, and/or provide augmented instructions, which are transmitted and overlaid on the actual weld scene or equipment in the user interface).

FIG. 7 is a flowchart representative of example machine readable instructions 700 which may be executed by the example welder interface 11 of FIG. 1 to select weld parameters.

At block 702, the welder interface 11 presents the user interface 500 of FIG. 5. At block 704, the welder interface 11 receives input via the user interface 500. The input may be menu-driven, free-form or natural language text input, and/or image driven. At block 706, the welder interface 11 identifies user-defined welding information from the user interface input. For example, the welder interface 11 may identify material to be welded, an expected result of the weld, an on-hand material, and/or weld equipment available to be used for the weld. At block 708, the welder interface 11 determines whether additional input is received. If additional input is received (block 708), control returns to block 706 to process the additional input.

When no further input is received (e.g., a user selects one of the buttons 518, 520 of FIG. 5) (block 708), at block 710 the welder interface 11 transmits a request including the user-defined welding information to a welding knowledge provider (e.g., the welding knowledge provider 200, the welding knowledge base 202, and/or the welding knowledge service 204). At block 712, the welder interface 11 determines whether welding plan(s) have been received in response to the request. If welding plan(s) have not been received (block 712), determines whether a timeout has occurred (block 713). If a time out has not occurred (block 713), control returns to block 712 to await the response. If a time out has occurred before the welding plan(s) are received (block 713), control returns to block 710 to retransmit the user-defined welding information to the welding knowledge provider 200).

When the welding plan(s) are received (block 712), at block 714 the welder interface 11 presents the received welding plan(s) 602, 604, 606 via a user interface (e.g., the user interface 600 of FIG. 6). The user interface 600 permits the user to view additional information about the welding plan(s), such as required equipment and/or consumables, and/or economic information about each welding plan. At block 716, the welder interface 11 determines whether one of the welding plan(s) has been selected. If a welding plan has not been selected (block 716), control returns to block 714 to continue presenting the welding plan(s) 602, 604, 606.

When a welding plan is selected (block 716), at block 718 the welder interface 11 determines whether an equipment configuration is included in the selected welding plan. If an equipment configuration is included in the selected welding plan (block 718), at block 720 the welder interface 11 configures the applicable welding equipment (e.g., the welding power supply 12, the wire feeder 14, etc.) using the selected welding plan. For example, the welder interface 11 may configure the equipment by configuring the welding power supply 12 with a welding program(s) and/or welding parameter(s).

After configuring the welding equipment (block 720), or if equipment configuration is not included in the selected welding plan (block 718), at block 722 the welder interface 11 determines whether supplies are required for the selected welding plan. If supplies are required for the selected welding plan (block 722), at block 724 the welder interface 11 presents a required list of supplies via the user interface 600. For example, the user interface 600 may present a welding power supply model number, a power supply rating plate, an image of welding equipment, an electrode composition, an electrode diameter, an electrode model number, a shielding gas composition, a shielding gas model number, a universal product code associated with a consumable item, an image of a consumable welding material, and/or purchasing information for the consumable welding material.

After presenting the required list of supplies (block 724), or if supplies are not required for the selected welding plan (block 722), at block 726 the welder interface 11 determines whether the selected welding plan includes operator instructions. If the selected welding plan includes operator instructions (block 726), at block 728 the welder interface 11 presents the operator instructions via the user interface 600. For example, the welder interface 11 may present welding cable and/or work cable connection information, welder safety information, a welding travel pattern, travel speed, contact tip to work distance, equipment set up instructions, workpiece fit up instructions, and/or welding operator body positioning instructions via the user interface 600.

After presenting the operator instructions (block 728), or if the selected welding plan does not include operator instructions (block 726), the example instructions 700 end.

Figure 8A:
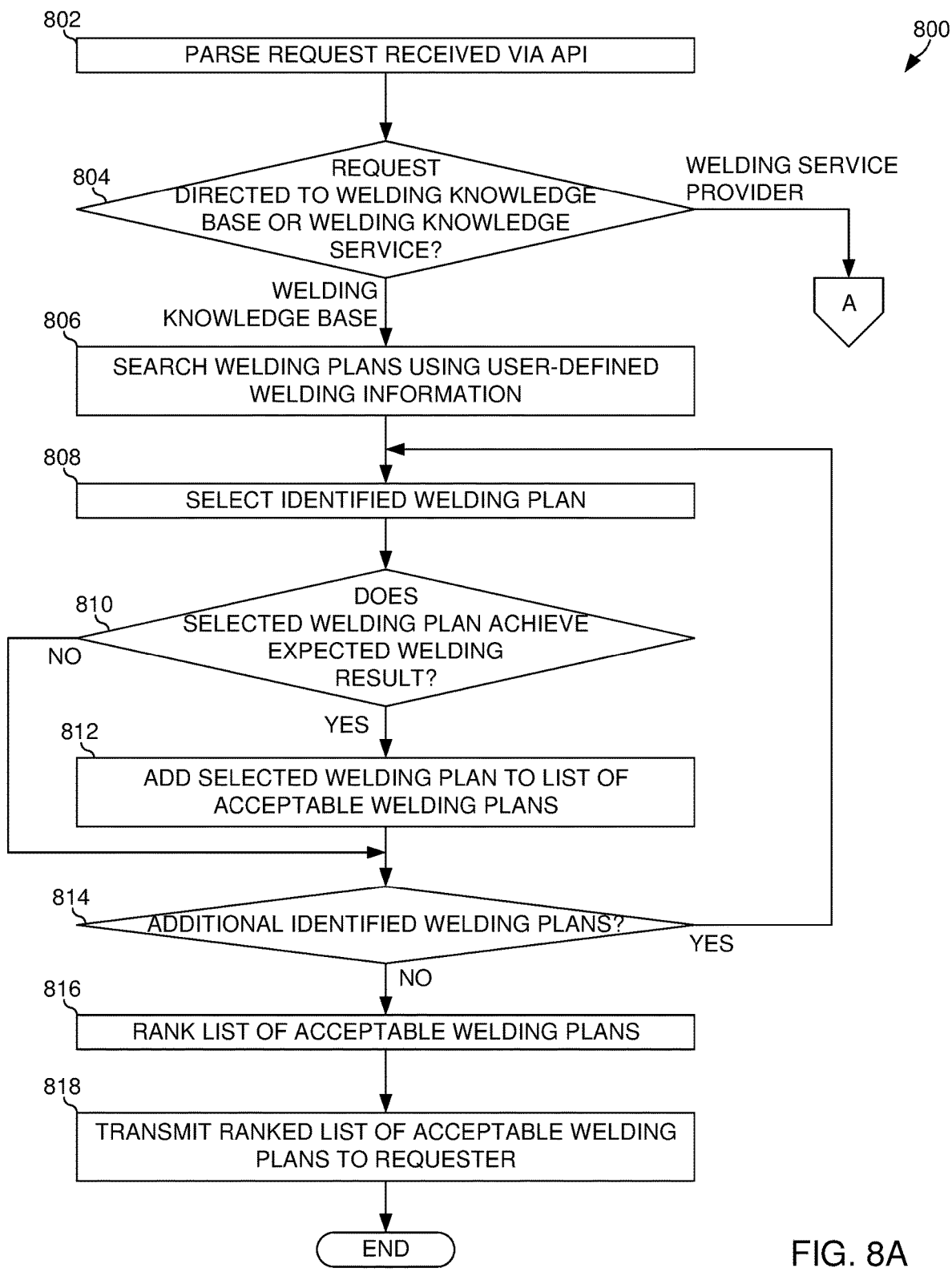
FIGS. 8A and 8B illustrate a flowchart representative of example machine readable instructions which may be executed by the example welding knowledge base of FIG. 1 to provide welding plan(s) to a requesting device.
Figure 8B:
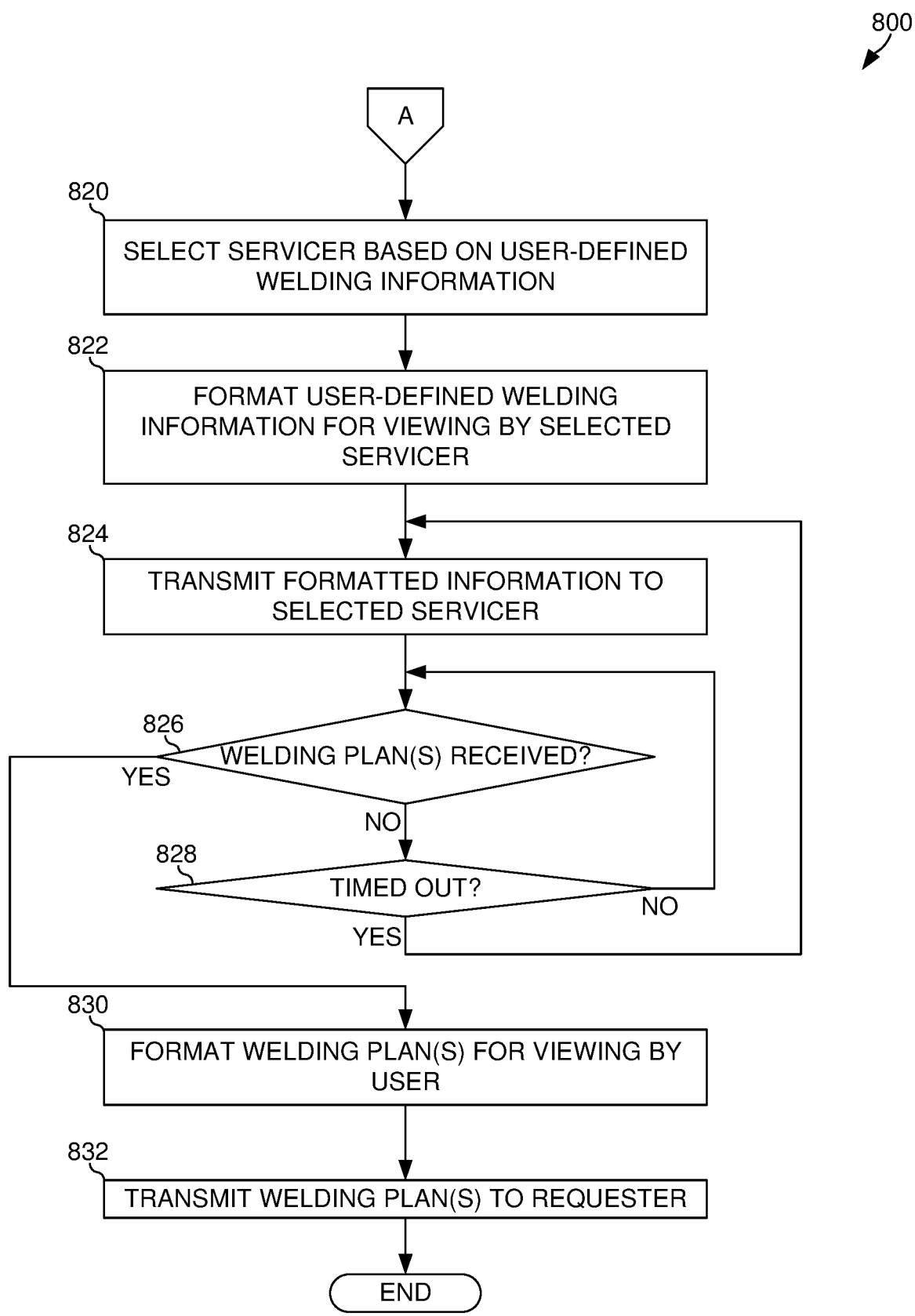

FIGS. 8A and 8B illustrate a flowchart representative of example machine readable instructions 800 which may be executed by the example welding knowledge base of FIG. 1 to provide welding plan(s) to a requesting device (e.g., to the user interface 11 of FIG. 1). The example instructions 800 may be executed by one or more computing devices (e.g., servers, etc.) when a request for a welding plan is received from a user interface device.

At block 802, the welding knowledge provider 200 parses the request received via an API. For example, the welding knowledge provider 200 may identify which types of user-defined welding information have been included in a formatted request and/or perform language processing to identify keywords or other welding information from natural language data.

At block 804, the welding knowledge provider 200 determines whether the request is directed to the welding knowledge base 202 or to the welding knowledge service 204.

If the request is directed to the welding knowledge base 202 (block 804), at block 806 the welding knowledge base 202 searches welding plans using user-defined welding information in the request. For example, the welding knowledge base 202 may run one or more queries using all and/or subsets of the user-defined welding information to identify welding plans closely related to the user-defined welding information. Identifying welding plans may include weighting the information for searching, identifying and searching individual databases for different types of welding, and/or using any other search techniques, rules, and/or algorithms for identifying welding plans. Example instructions that may be used to implement block 806 to search for welding plans based on electrical, thermal, chemical, and/or physical characteristics is described below with reference to FIG. 9.

At block 808, the welding knowledge base 202 selects a welding plan identified during searching. For the selected welding plan, at block 810 the welding knowledge base 202 determines whether the selected welding plan achieves the expected welding result, which may be specified in the user-defined welding information or, if not define, assumed based on a default result. When the selected welding plan achieves the expected welding result (block 810), at block 812 the welding knowledge base 202 adds the selected welding plan to a list of acceptable welding plans.

After adding the selected welding plan to a list of acceptable welding plans (block 812), or if the selected welding plan does not achieve the expected welding result (block 810), at block 814 the welding knowledge base 202 determines whether there are additional identified welding plans. If there are no additional identified welding plans (block 814), at block 816 the welding knowledge base 202 ranks the list of the acceptable welding plans. At block 818, the welding knowledge base 202 transmits the ranked list of acceptable welding plans to the requester (e.g., the user interface 11). The example instructions 800 then end.

If the request is directed to the welding service provider 204 (block 804), at block 820 the welding service provider 204 selects a servicer (e.g., a welding technician) based on the user-defined welding information in the request. At block 822, the welding service provider 204 formats the user-defined welding information for viewing by the selected servicer. At block 824, the welding service provider 204 transmits formatted information to the selected servicer.

At block 826, the welding service provider 204 determines whether the welding plan(s) are received. If the welding plan(s) are not received (block 826), at block 828 the welding service provider 204 determines whether a time out occurred. If a time out did not occur (block 828), control returns to block 826 to receive the welding plan(s). If a time out does occur (block 828), control returns to block 824 to retransmit the formatted information.

When the welding plan(s) are received (block 826), at block 830 the welding service provider 204 formats the welding plan(s) for viewing by the user. For example, the welding service provider 204 may format the welding plans according to a predetermined format for parsing and display by the user interface 11. At block 832, the welding service provider 204 transmits the formatted welding plan(s) to the requester. After transmitting the welding plan(s), the example instructions 800 end.

While the example instructions 800 may be executed for an example welding knowledge provider 200 that includes both the welding knowledge base 202 or only the welding knowledge service 204, in other examples the welding knowledge provider 200 includes only the welding knowledge base 202 or only the welding knowledge service 204. If the welding knowledge provider 200 includes only the welding knowledge base 202, example blocks 804 and 820-832 may be omitted. Conversely, if the welding knowledge provider 200 includes only the welding knowledge service 204, blocks 804-818 may be omitted.

Figure 9:
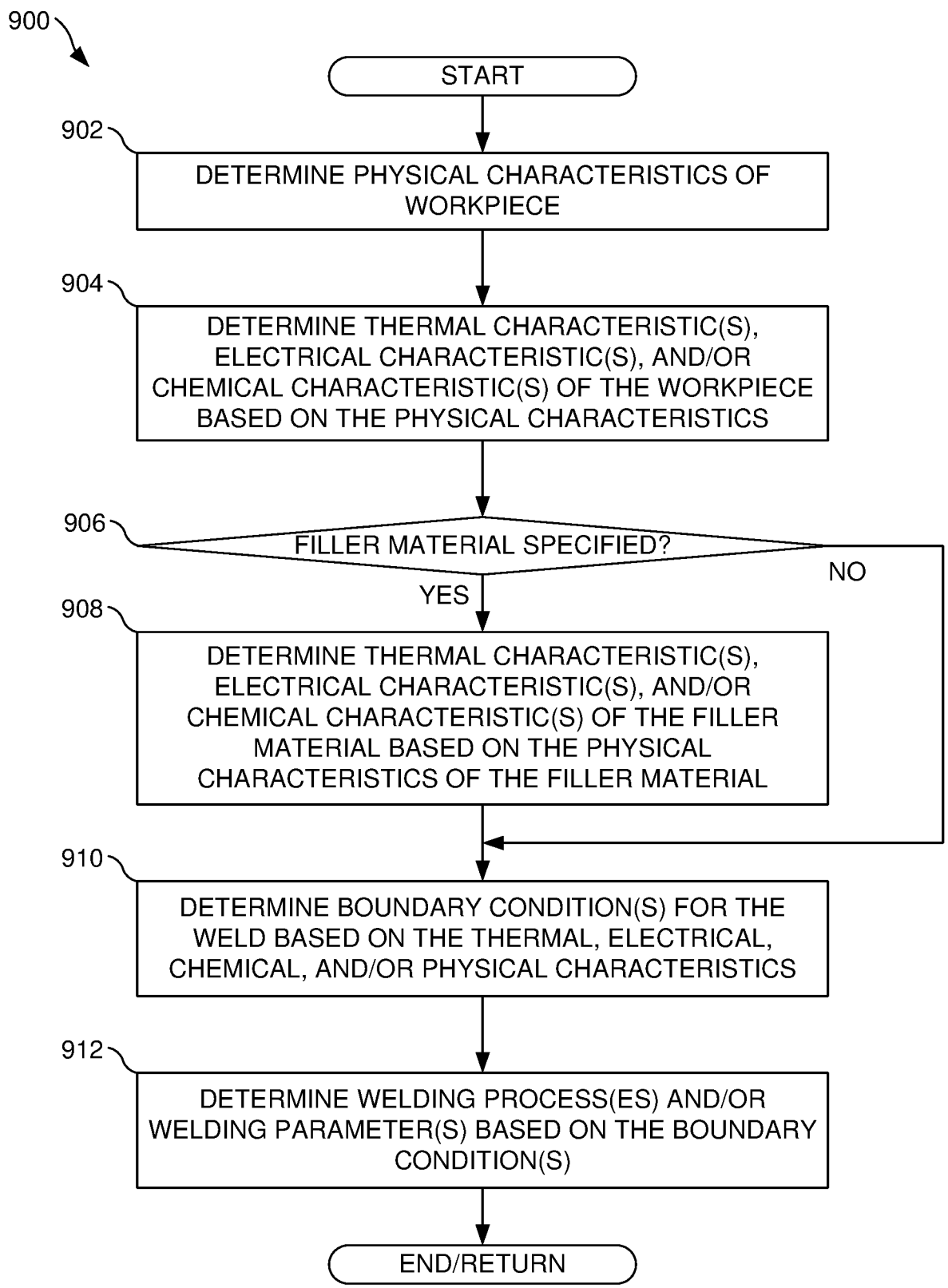
FIG. 9 is a flowchart representative of example machine readable instructions which may be executed by the example welder interface and/or the example welding knowledge base of FIG. 1.

FIG. 9 is a flowchart representative of example machine readable instructions 900 which may be executed by the example welder interface 11 and/or the example welding knowledge base 202 of FIG. 1 to implement the system 300 of FIG. 3.

At block 902, the system 300 determines physical characteristics of a workpiece to be welded. For example, the system 300 may receive inputs 302 via the interface 11, such as the workpiece material (e.g., base metal, alloy, alloying ingredients, etc.), work piece condition, weld size, joint preparation, weld joint, room for expansion and contraction within the welding fixture and weldment, a workpiece thicknesses, a workpiece cleanliness, a joint type, a weld position (e.g., flat, horizontal, vertical, overhead, etc.), a shielding gas type, and/or a gap width. In some examples, the system 300 determines (e.g., retrieves, looks up) more detailed physical characteristics of the workpiece from high level descriptions (e.g., a workpiece alloy name or number).

At block 904, based on the physical characteristics identified in the input 302, the system 300 determines one or more thermal characteristic(s) of the workpiece 304, one or more electrical characteristic(s) of the workpiece 306, and/or one or more chemical characteristic(s) of the workpiece 308. For example, based on the physical characteristics, the system 300 may determine one or more of the example thermal characteristics 304, electrical characteristics 306, and/or chemical characteristics 308 disclosed above.

At block 906, the system 300 determines whether a filler material (e.g., filler wire) is specified (e.g., via the interface 11, via a WPS, via scanning a barcode, and/or any other method of input). If a filler material is specified (block 906), at block 908 the system 300 determines, based on the physical characteristics of the filler material identified in the input 302, one or more thermal characteristic(s) of the filler wire 310, one or more electrical characteristic(s) of the filler wire 312, and/or one or more chemical characteristic(s) of the filler wire 314. For example, based on the physical characteristics, the system 300 may determine one or more of the example thermal characteristics 310, electrical characteristics 312, and/or chemical characteristics 314 disclosed above.

After determining the characteristic(s) 310-314 (block 908), or if a filler material is not specified (block 906), at block 910 the system 300 determines boundary condition(s) 318 for the weld based on the determined thermal, electrical, chemical, and/or physical characteristics. For example, the system 300 may determine one or more limits on any one or more variables or parameters associated with the welding operation, such as heat input, power, voltage, current, penetration, peak current, current change rates (e.g., di/dt), travel speed, torch angles, and/or any other weld variables and/or parameters. In some examples, the boundary conditions 318 may be further determined based on needs 316 identified via the interface 11 and/or the interface 500.

At block 912, the system 300 determines one or more welding processes (e.g., base or foundational processes, weld metal transfer modes, process enhancers, etc.) and/or welding parameters based on the boundary conditions 318. The example system 300 may output the recommended processes and/or parameters via the interface 11 and/or the interface 500, transmit the recommendation to an external interface device for presentation to the requester, configure a welding-type power supply to implement the recommended processes and/or parameters, and/or otherwise output the recommendation. The example instructions 900 may then end and/or return to another process.

Different welding processes, whether including or omitting process enhancers, have areas of application overlap. A weld operator can achieve similar results at the high (hot) end of a cold process as the low (cold) end of a hot process. In some examples, the interface 11 may recommend a welding process, out of multiple potential welding processes, to improve the ease of transition from one process to another process to reduce or eliminate operator intervention during the transition. Such recommendations may be used when the interface 11 is also configured to control the welding operation in real-time based on the recommended process and receiving feedback information. Example instructions to control the welding system based on feedback information are disclosed below with reference to FIG. 10.

Determination of the physical characteristic(s) (block 902), determination of the thermal, electrical, and/or chemical characteristic(s) (block 904, block 908), determination of the boundary conditions (block 910), and/or determination of the welding process(es) and/or parameter(s) (block 912) may be performed using, for example, lookup tables stored at the interface 11 and/or remotely, using external computing systems to perform lookups, simulation, or modeling (e.g., the welding knowledge provider 200, a cloud-based system, etc.), using a machine learning system, using an artificial intelligence (AI) system, and/or any other data processing technique. Any of the lookup tables, simulation, modeling, machine learning, AI, and/or any other data processing technique may be populated, trained, and/or otherwise informed using empirically determined welding information regarding workpiece materials, alloys, and/or chemistries, filler metals, alloys, and/or chemistries, combinations of materials, alloys, and/or chemistries in weld pools, and/or any other theory-derived and/or empirically derived welding data. As understood by a person of ordinary skill in the art, the determination of such information may require substantial testing and observation to obtain and populate into the disclosed systems.

Figure 10:
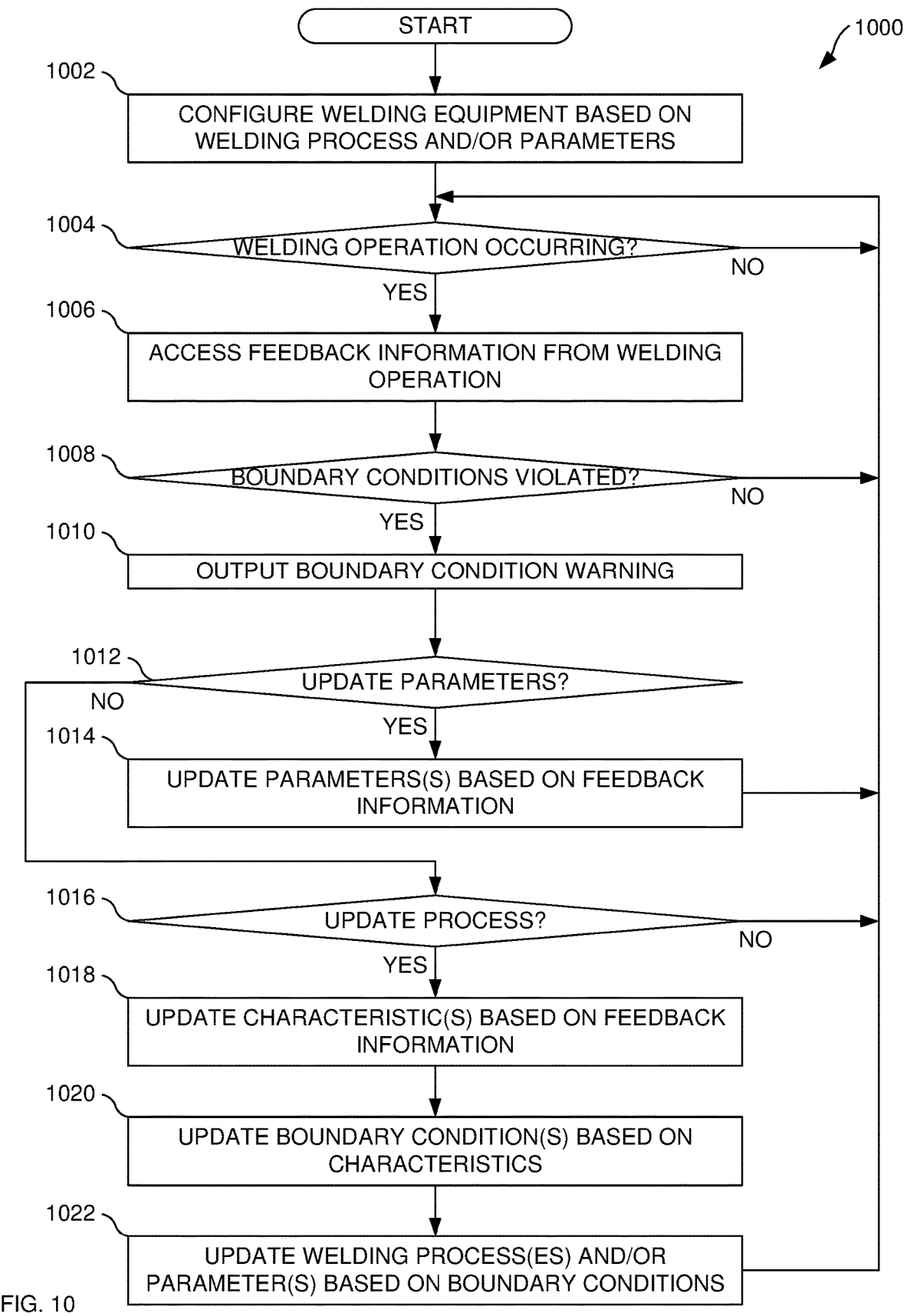
FIG. 10 is a flowchart representative of example machine readable instructions which may be executed by the example welder interface of FIG. 1 to control a welding process.

FIG. 10 is a flowchart representative of example machine readable instructions 1000 which may be executed to control a welding process. The example instructions 1000 may be performed by the example interface 11 and/or the interface 500 in communication with welding equipment, such as the welding-type power supply 10, the wire feeder 14, the automation system 34, and/or any other configurable equipment. The example instructions 1000 may be performed following selection of a welding process recommended by the interface 11 or the interface 500 (e.g., based on the thermal, electrical, and/or chemical characteristics of the workpiece and/or the filler wire) to control the welding equipment based on the selected welding process.

At block 1002, the interface 11 configures welding equipment (e.g., the welding-type power supply 10, the wire feeder 14, the automation system 34, and/or any other configurable equipment) based on the welding process and/or parameters. The configuration may involve configuring waveforms, base processes, process enhancers, and/or any other parameters or variables identified by the interface 11 and/or modified by the operator.

At block 1004, the interface 11 determines whether a welding operation is occurring. For example, the interface 11 may determine whether welding current is flowing via a current sensor (e.g., sensors 48 of FIG. 1), via communication with the power supply 10, and/or any other manner of identifying an ongoing welding operation. If a welding operation is not occurring (block 1004), control returns to block 1004 to monitor for a welding operation.

If a welding operation is occurring (block 1004), at block 1006 the interface 11 accesses feedback information from the welding operation. For example, the interface 11 may receive data from any or all of the sensors 48 of FIG. 1. Example feedback information from the sensors 48 may include a weld voltage, a weld current, a weld power, an enthalpy, a preheating voltage, a preheating current, a preheating power, a penetration depth, a puddle dimension, a workpiece temperature, a short circuit duration, a short circuit frequency, a short circuit clear current, a travel speed, light spectrum to determine wire/weld pool chemistry, light spectrum (e.g., to determine temperature), gas flow rate, gas composition, torch angle(s), a contact tip to work distance, a chemical analysis of a fume emitted from the weld, and/or any other information.

At block 1008, the interface 11 determines whether any of the boundary conditions associated with the welding process are violated based on the feedback information. For example, the interface 11 may determine whether any variables or parameters of the welding process are not abiding by limits set by the boundary conditions. If none of the boundary conditions are violated (block 1008), control returns to block 1004 to continue monitoring the welding operation.

If any of the boundary conditions are violated (block 1008), at block 1010 the interface 11 outputs a boundary condition warning. The warning may be a visual alert, an audible alert, an electronic communication, a log entry, and/or any other warning.

At block 1012, the interface 11 determines whether to update the parameters of the welding equipment. For example, the interface 11 may determine that the parameters may be updated as a first measure in response to violation of boundary conditions, and/or if the interface 11 knows that the boundary conditions can be satisfied with a change in parameters. Conversely, if the parameters have previously been changed and the boundary conditions are not satisfied, the interface 11 may decide not to update parameters and to proceed to more substantial updates (e.g., updates to the welding process).

If the parameters are to be updated (block 1012), at block 1014 the interface 11 updates one or more parameters of the welding process based on the feedback information and the boundary conditions. The example instructions 1000 then return to block 1004 to continue monitoring the welding operation.

If the parameters are not to be updated (block 1012), at block 1016 the interface 11 determines whether the welding process is to be updated. For example, the interface 11 may observe feedback indicating that thermal, electrical, physical, and/or chemical characteristics are to be updated, that boundary conditions are to be updated, and/or that the welding process (e.g., base process, process enhancers, waveforms, etc.) are to be updated. If the process is not to be updated (block 1016), control returns to block 1004 to continue monitoring the welding operation.

If the process is to be updated (block 1016), at block 1018 the interface 11 updates characteristic(s) based on the feedback information. For example, if a change in workpiece thickness is observed, excess dirt or impurities are observed, and/or any other feedback information is observed that indicates that the thermal, electrical, physical, and/or chemical characteristics are different than previously identified, the example interface 11 may identify the additional and/or changed thermal, electrical, physical, and/or chemical characteristics from the feedback information. For example, by sensing the light spectrum of the arc light, the interface 11 may update the characteristics based on the observed chemical makeup of the elements and/or compounds in the plasma (e.g., from the workpiece, filler metal, and/or shielding gas). In response to the detection of a particular element or compound, the interface may adjust the determined characteristics.

At block 1020, the interface 11 updates the boundary condition(s) based on the updated characteristics and/or feedback information. In this respect, block 1020 may be performed in a similar or identical manner as block 910 of FIG. 9.

At block 1022, the interface 11 updates the welding process(s) and/or parameters based on the boundary conditions. For example, the interface 11 may determine updated base processes, process enhancers, waveforms, parameters, and/or any other aspects of the welding process based on the updated boundary conditions. In this respect, block 1022 may be performed in a similar or identical manner as block 912 of FIG. 9. Control then returns to block 1004 to continue monitoring the welding operation.

Where appropriate, the updated characteristics, boundary conditions, and/or welding processes and/or parameters may be determined and implemented in real-time to correct for operator errors observed in the weld. For example, if the operator is performing the weld using an incorrect travel speed, torch angle, and/or contact tip to work distance, the interface 11 may adapt the welding process to reduce the likelihood of welding anomalies due to the operator error.

In some examples, interface 11 further provides the operator or welder to have a cleaning adjustment that would allow for more time and/or current in the electrode negative polarity, more time and/or current in the electrode positive polarity, and/or a porosity adjustment that provides for additional Controlled Short Circuit cycles to modify porosity reduction from the recommended amounts. The interface 11 may provide for any desired adjustments to recommended processes and/or parameters, such as penetration, heat affected zone, and/or any other parameters.

Figure 11:
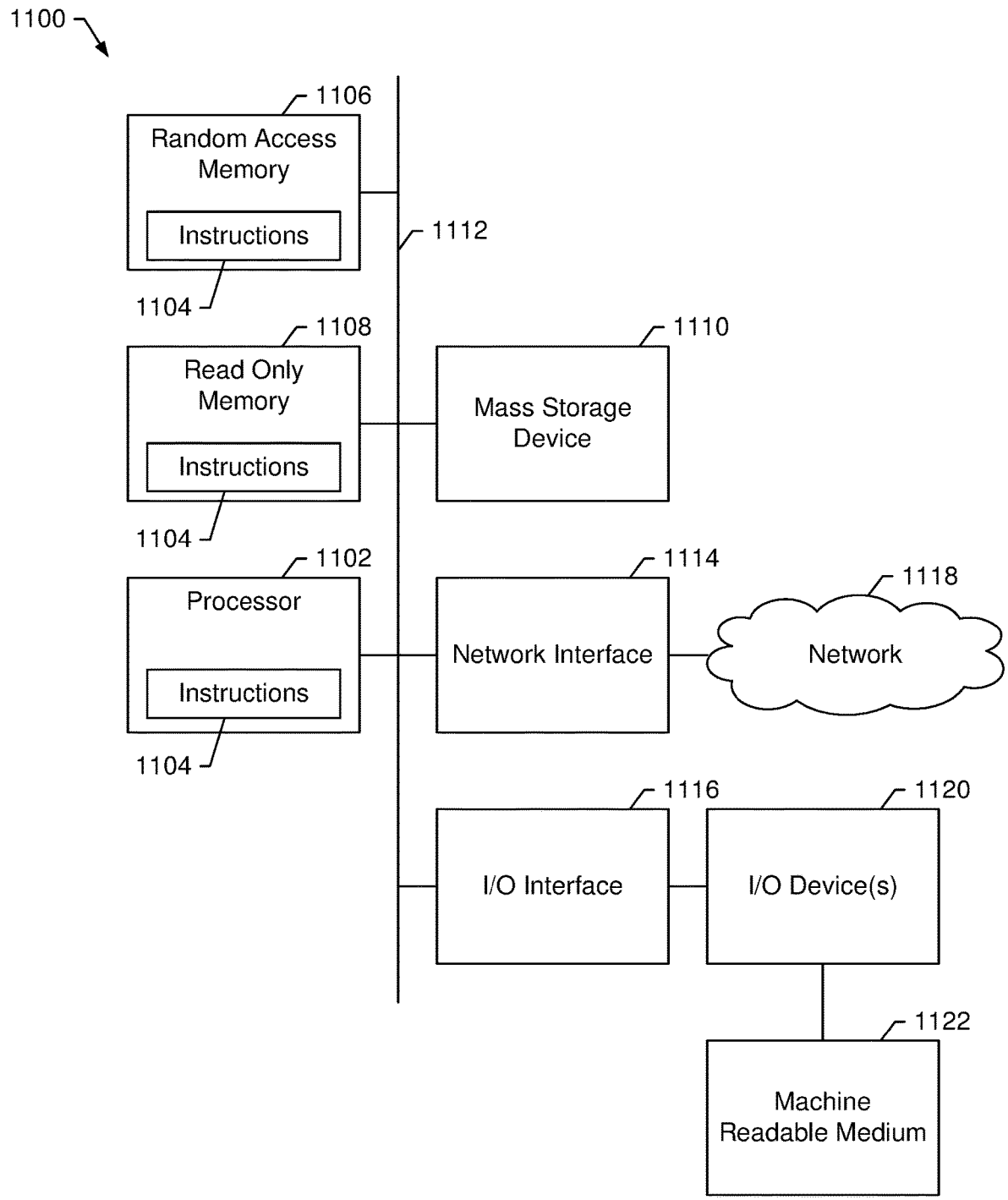
FIG. 11 is a block diagram of an example implementation of the welder interface of FIG. 1.

FIG. 11 is a block diagram of an example computing system 1100 that may be used to implement the welder interface 11, the welding knowledge base 202, and/or the welding knowledge service 204 of FIG. 1, and/or the system 300 of FIG. 3. The example computing system 1100 of FIG. 11 may be a welding device, a general-purpose computer, a laptop computer, a tablet computer, a mobile device, a server, and/or any other type of computing device. In some examples, the computing system 1100 may be implemented in a cloud computing environment using one or more physical machines and, in some examples, one or more virtual machines in the data center.

The example computing system 1100 of FIG. 11 includes a processor 1102. The example processor 1102 may be any general purpose central processing unit (CPU) from any manufacturer. In some other examples, the processor 1102 may include one or more specialized processing units, such as RISC processors with an ARM core, graphic processing units, digital signal processors, and/or system-on-chips (SoC). The processor 1102 executes machine readable instructions 1104 that may be stored locally at the processor (e.g., in an included cache or SoC), in a random access memory 1106 (or other volatile memory), in a read only memory 1108 (or other non-volatile memory such as FLASH memory), and/or in a mass storage device 1110. The example mass storage device 1110 may be a hard drive, a solid state storage drive, a hybrid drive, a RAID array, and/or any other mass data storage device. In some examples, the system 300 of FIG. 3 may be implemented using the machine readable instructions 1104 stored in one or more of the random access memory 1106, the read only memory 1108, the mass storage device 1110, and/or other storage device, and executed via the processor 1102.

A bus 1112 enables communications between the processor 1102, the RAM 1106, the ROM 1108, the mass storage device 1110, a network interface 1114, and/or an input/output interface 1116.

The example network interface 1114 includes hardware, firmware, and/or software to connect the computing system 1100 to a communications network 1118 such as the Internet. For example, the network interface 1114 may include IEEE 1102.X-compliant wireless and/or wired communications hardware for transmitting and/or receiving communications.

The example I/O interface 1116 of FIG. 11 includes hardware, firmware, and/or software to connect one or more input/output devices 1120 to the processor 1102 for providing input to the processor 1102 and/or providing output from the processor 1102. For example, the I/O interface 1116 may include a graphics processing unit for interfacing with a display device, a universal serial bus port for interfacing with one or more USB-compliant devices, a FireWire, a field bus, and/or any other type of interface. Example I/O device(s) 1120 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example welder interface 11 may access a non-transitory machine readable medium 1122 via the I/O interface 1116 and/or the I/O device(s) 1120. Examples of the machine readable medium 1122 of FIG. 11 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding interface device, comprising:
a user interface device;
a processor; and
a machine readable storage device comprising machine readable instructions which, when executed by the processor, cause the processor to:
determine, via the user interface device, information describing physical characteristics of a workpiece for a weld to be performed;
based on the physical characteristics, determining at least one of a thermal characteristic of the workpiece, an electrical characteristic of the workpiece, or a chemical characteristic of the workpiece;
determine a boundary condition associated with the workpiece based on the at least one of the thermal characteristic, the electrical characteristic, or the chemical characteristic; and
output a welding process based on the boundary condition.

2. The welding interface device as defined in claim 1, wherein the instructions are configured to cause the processor to determine the thermal characteristic of the workpiece by determining at least one of thermal conductivity, shrinkage rate, cooling rate, melting temperature, solidification temperature, solidification time, vaporization temperature, vaporization time, or a thermal expansion coefficient.

3. The welding interface device as defined in claim 1, wherein the instructions are configured to cause the processor to determine the chemical characteristic of the workpiece by determining at least one of a grain structure, base metal effects from autogenous welding, dilution, heat affect zone, discoloration, smut, solidification crack sensitivity, hot crack sensitivity, hydrogen solubility, porosity, alloy chemistry, quantity of impurities on the workpiece, or a type of impurities on the workpiece based on the physical characteristics.

4. The welding interface device as defined in claim 1, wherein the instructions are configured to cause the processor to determine the electrical characteristic of the workpiece by determining at least one of electrical resistivity, emissivity, oxidation resistivity, or magnetic susceptibility.

5. The welding interface device as defined in claim 1, wherein the physical characteristics comprise at least one of a workpiece material, work piece condition, weld size, joint preparation, weld joint, room for expansion and contraction within the welding fixture and weldment, a workpiece thicknesses, a workpiece cleanliness, a joint type, a weld position, or a gap width.

6. The welding interface device as defined in claim 1, wherein the instructions are configured to cause the processor to:
determine, via the user interface device, information describing physical characteristics of a filler material for the weld to be performed; and
based on the physical characteristics, determining at least one of a thermal characteristic of the filler material, an electrical characteristic of the filler material, or a chemical characteristic of the filler material.

7. The welding interface device as defined in claim 6, wherein the physical characteristics of the filler material comprise at least one of a wire composition, a wire base metal, a wire filler material, or a wire diameter.

8. The welding interface device as defined in claim 6, wherein the instructions are configured to cause the processor to determine the electrical characteristic of the filler material by determining at least one of electrical resistivity of the filler wire, electrical resistivity of a cored wire sheath, electrical resistivity of a wire core material, cross-section proportion of the wire sheath, cross-section proportion of the wire core material, emissivity, oxidation resistivity, or magnetic susceptibility.

9. The welding interface device as defined in claim 6, wherein the instructions are configured to cause the processor to determine the thermal characteristic of the filler material by determining at least one of a solidification temperature, a melting temperature, a vaporization temperature, thermal conductivity, a shrinkage rate, a cooling rate, or a thermal expansion coefficient.

10. The welding interface device as defined in claim 6, wherein the instructions are configured to cause the processor to determine the chemical characteristic of the filler material by determining at least one of grain structure, nano-particle content, ductility, columnar strength, a quantity of impurities in the filler wire, a type of impurities in the filler wire, hydrogen solubility, alloy chemistry, and base chemistry.

11. The welding interface device as defined in claim 1, wherein the instructions are configured to cause the processor to determine the welding process and weld material transfer mode by including at least one of a Controlled Short Circuit, an alternating current (AC) wire-fed process, or a pulse process as at least part of the determined welding process.

12. The welding interface device as defined in claim 1, wherein the instructions are configured to cause the processor to determine the boundary condition by determining a first limit on the welding process based on the at least one of the thermal characteristic, the electrical characteristic, or the chemical characteristic, wherein the first limit is determined to reduce a likelihood of a welding anomaly in the weld.

13. The welding interface device as defined in claim 12, wherein the instructions are configured to cause the processor to determine the boundary condition by determining the first limit based on at least one of a thermal characteristic of a filler material for the weld to be performed, an electrical characteristic of the filler material, or a chemical characteristic of the filler material.

14. The welding interface device as defined in claim 12, wherein the instructions are configured to cause the processor to determine the boundary condition by determining a second limit on the welding process.

15. The welding interface device as defined in claim 14, wherein the first limit is a lower limit on a parameter of the welding process and the second limit is an upper limit on the same parameter of the welding process.

16. The welding interface device as defined in claim 1, wherein the instructions are configured to cause the processor to, during creation of the weld:
control a welding system based on the welding process to create the weld;
access feedback information from the welding system, the feedback information comprising a plurality of variables detected by one or more sensors of the welding system;
determine, based on the feedback information, at least one of a second thermal characteristic of the workpiece, a second electrical characteristic of the workpiece, a second chemical characteristic of the workpiece, a thermal characteristic of a filler material used for the weld, an electrical characteristic of the filler material, or a chemical characteristic of the filler material;
change the boundary condition based on the determined characteristic; and
control the welding system to perform the welding process based on the changed boundary condition.

17. The welding interface device as defined in claim 16, wherein the instructions are configured to cause the processor to determine a second boundary condition based on the determined characteristic.

18. The welding interface device as defined in claim 16, wherein the feedback information comprises at least one of a weld voltage, a weld current, a weld power, an enthalpy, a preheating voltage, a preheating current, a preheating power, a penetration depth, a puddle dimension, a workpiece temperature, a short circuit duration, a short circuit frequency, a short circuit clear current, a travel speed, light spectrum to determine wire/weld pool chemistry, torch angle, CTWD, or a chemical analysis of a fume emitted from the weld.

19. The welding interface device as defined in claim 1, wherein the instructions are configured to cause the processor to configure a welding-type power supply to perform the weld according to the welding process.

20. The welding interface device as defined in claim 1, wherein the instructions are configured to cause the processor to determine at least one of the thermal characteristic of the workpiece, the electrical characteristic of the workpiece, the chemical characteristic of the workpiece, or the boundary condition by communicating the information describing the physical characteristics of the workpiece to an external computing system and receiving the at least one of the thermal characteristic of the workpiece, the electrical characteristic of the workpiece, the chemical characteristic of the workpiece, or the boundary condition from the external computing system.

* * * * *